Figure 1A:
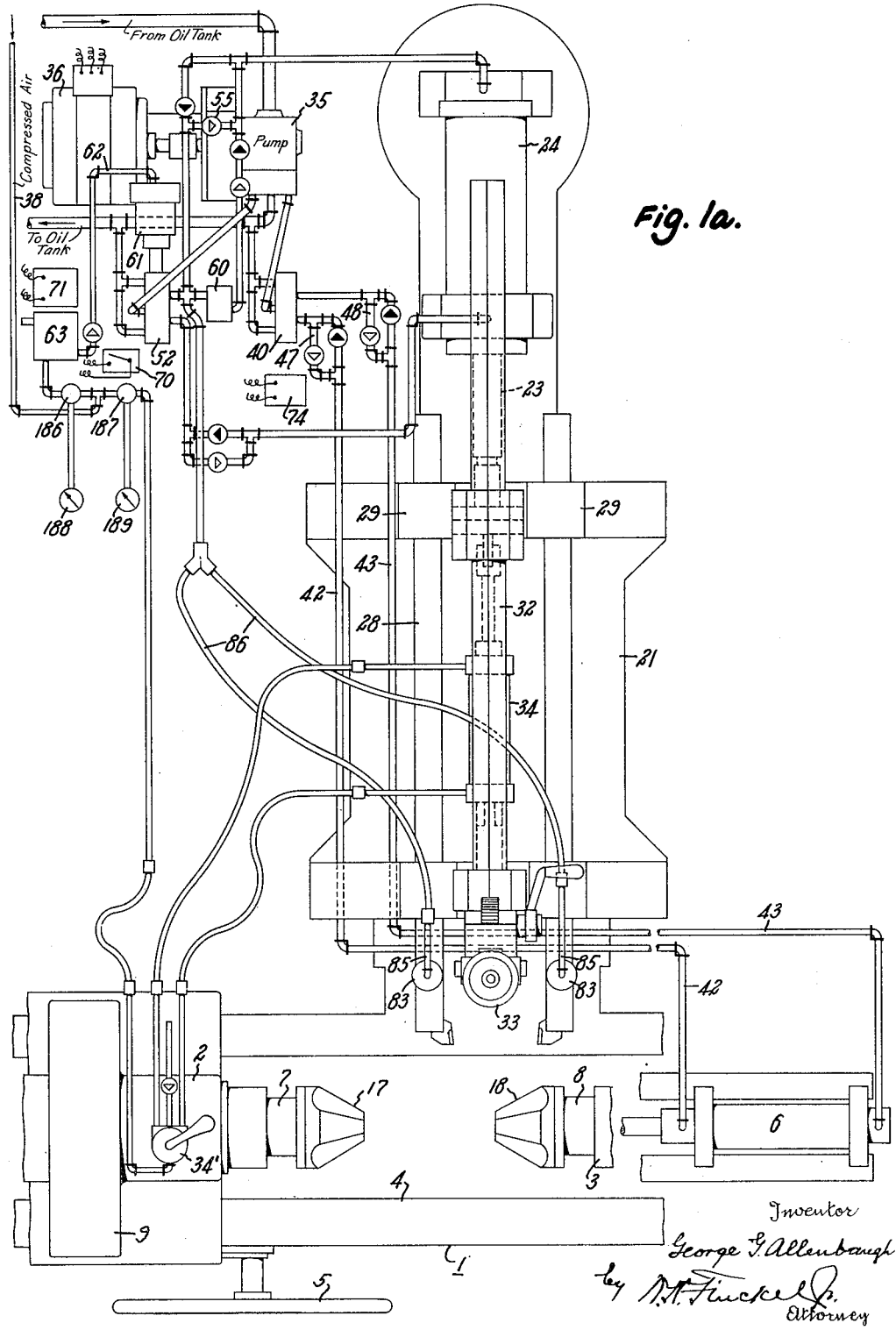

May 8, 1951  G. G. ALLENBAUGH  2,551,716
MACHINING APPARATUS
Filed Feb. 5, 1946  17 Sheets-Sheet 1
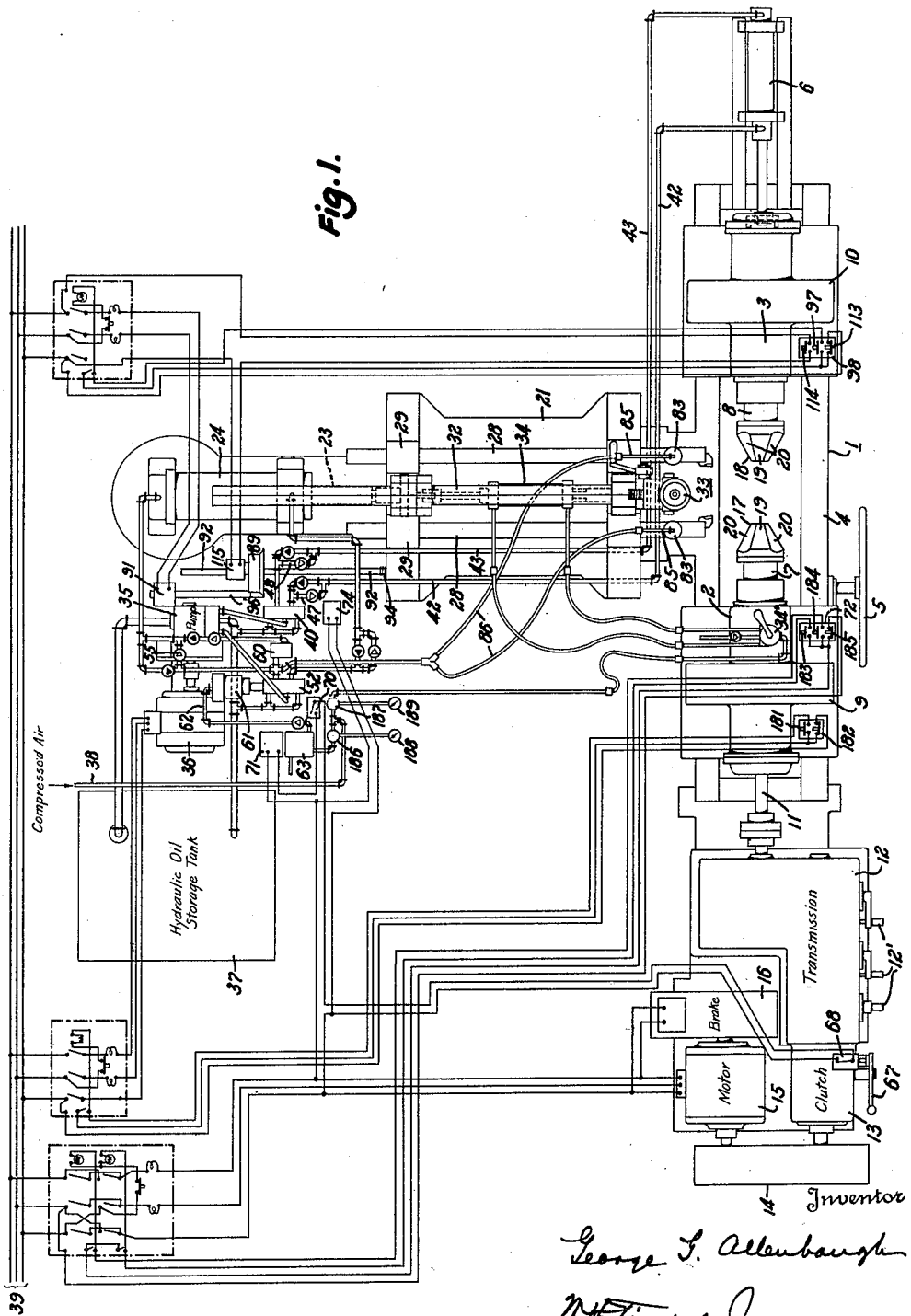
Inventor
George G. Allenbaugh
By N. W. Finckel Jr.
Attorney May 8, 1951 G. G. ALLENBAUGH 2,551,716
MACHINING APPARATUS
Filed Feb. 5, 1946 17 Sheets-Sheet 3
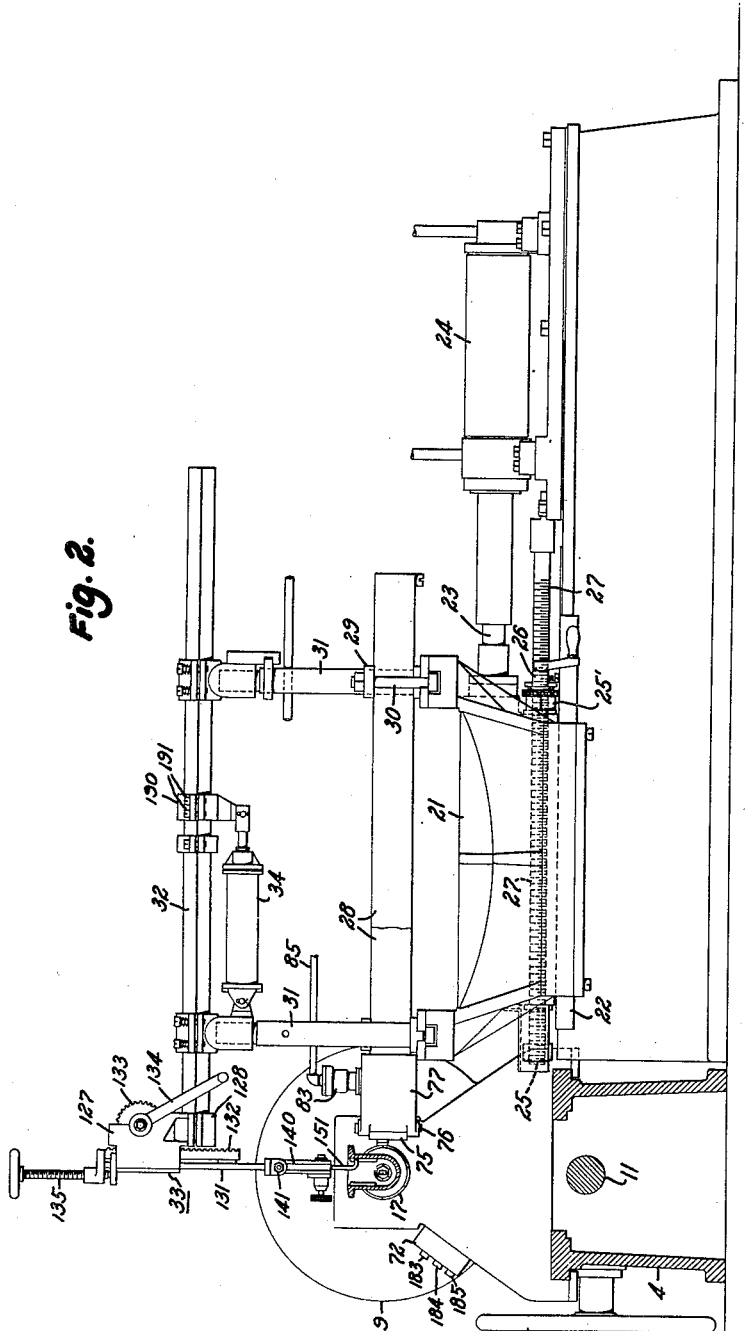
Inventor
George G. Allenbaugh
By W. H. Finckel Jr.
Attorney

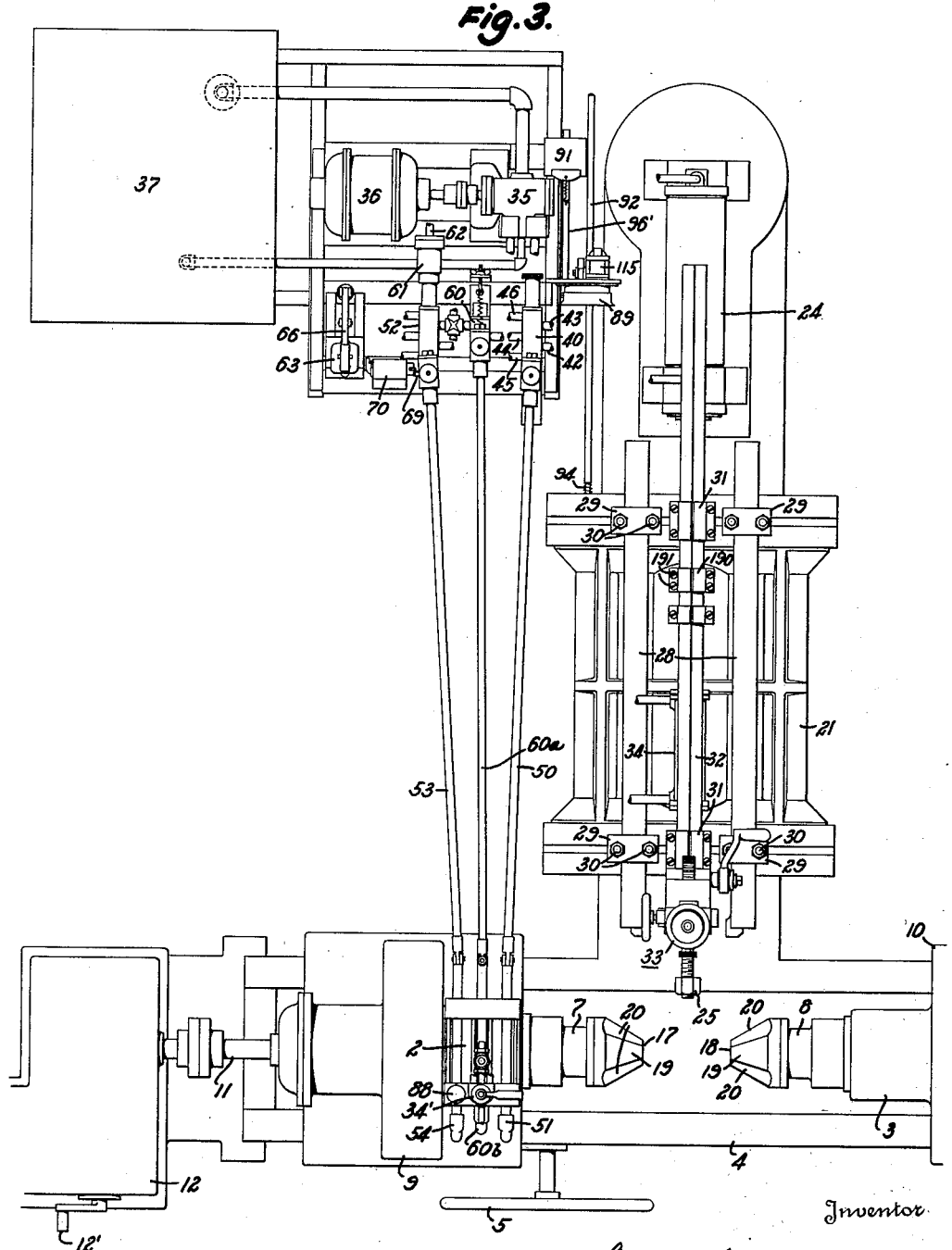

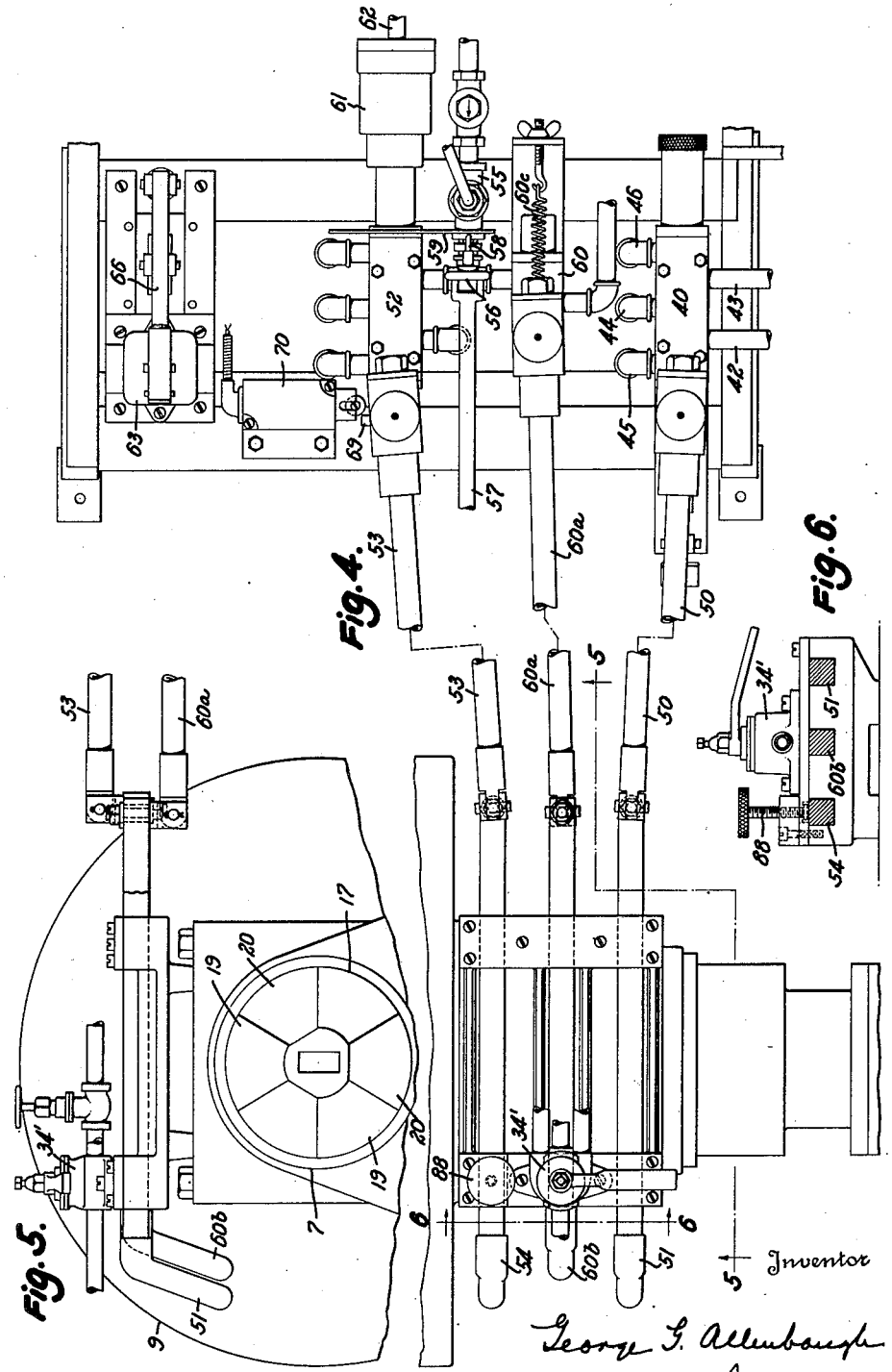

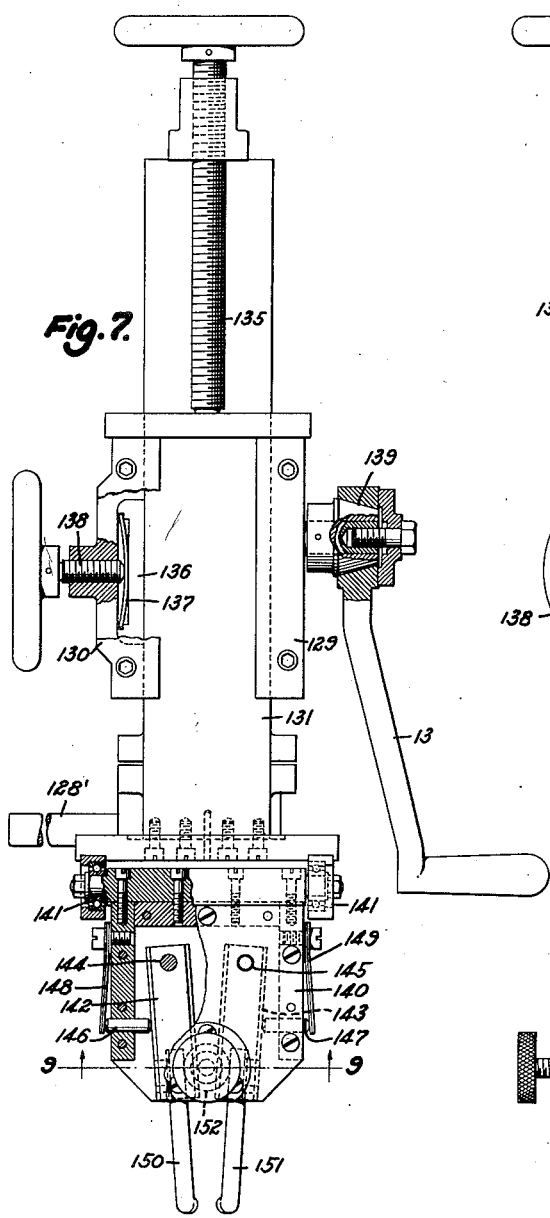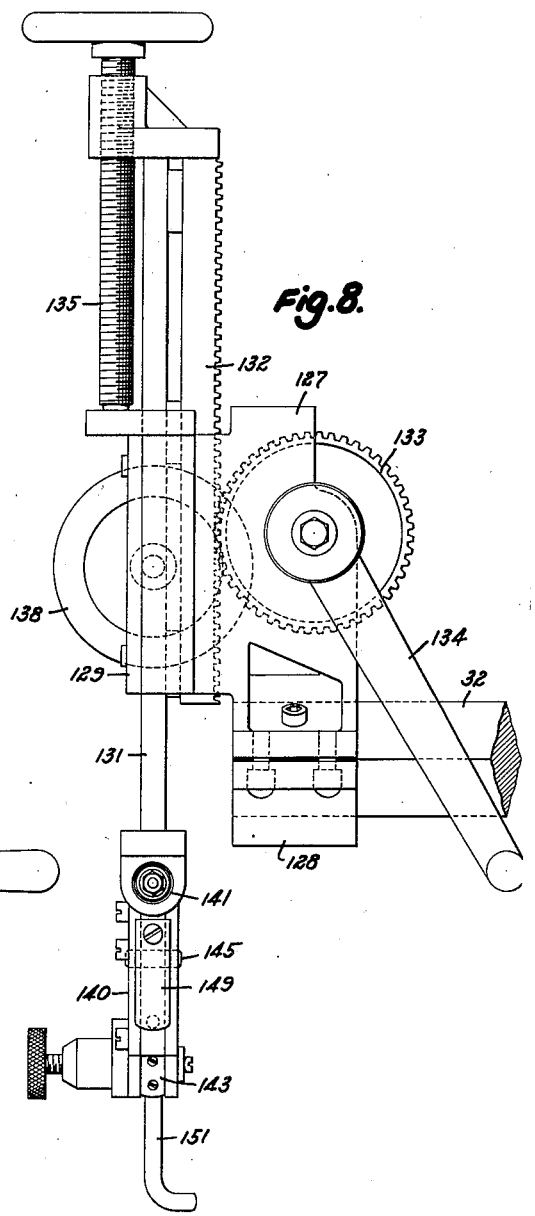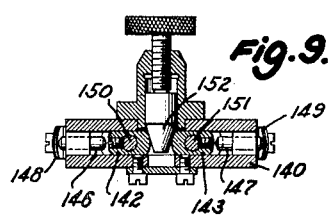

May 8, 1951  G. G. ALLENBAUGH  2,551,716
MACHINING APPARATUS
Filed Feb. 5, 1946  17 Sheets-Sheet 7
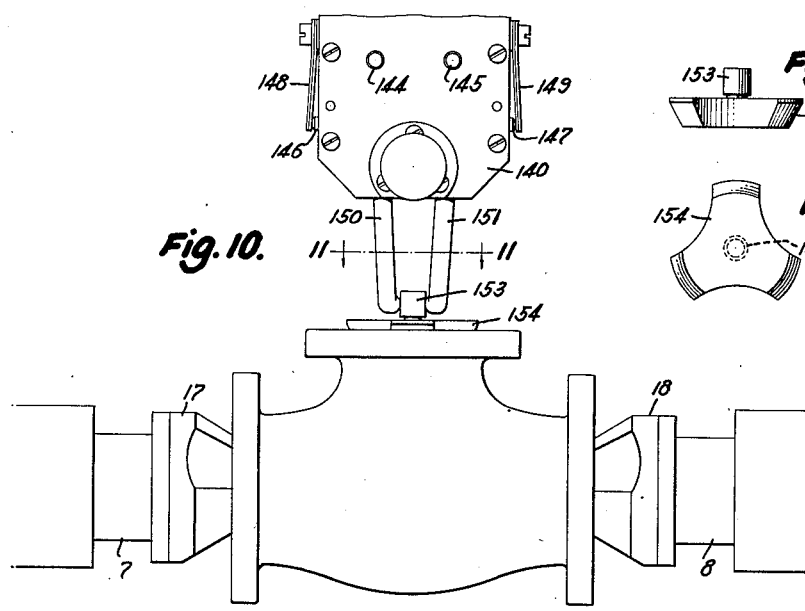
Fig. 10.
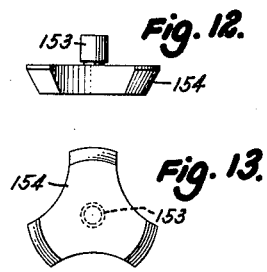
Fig. 12.
Fig. 13.
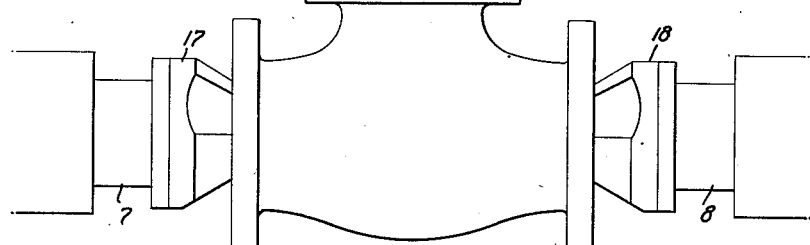
Fig. 11.
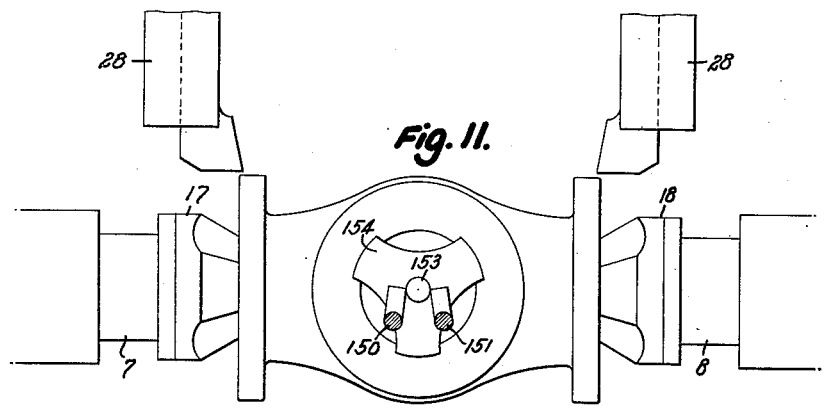
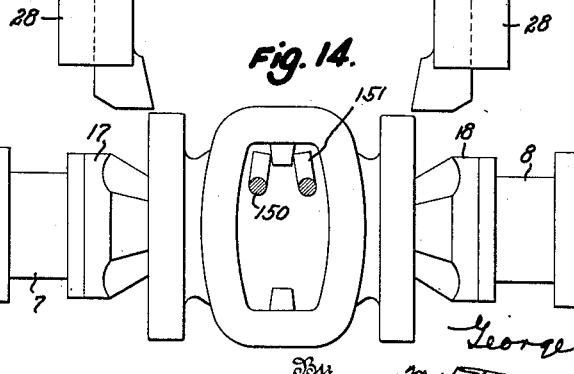
Fig. 14.
Inventor
George G. Allenbaugh
By N. N. Finckel Jr.
Attorney May 8, 1951        G. G. ALLENBAUGH        2,551,716
MACHINING APPARATUS
Filed Feb. 5, 1946
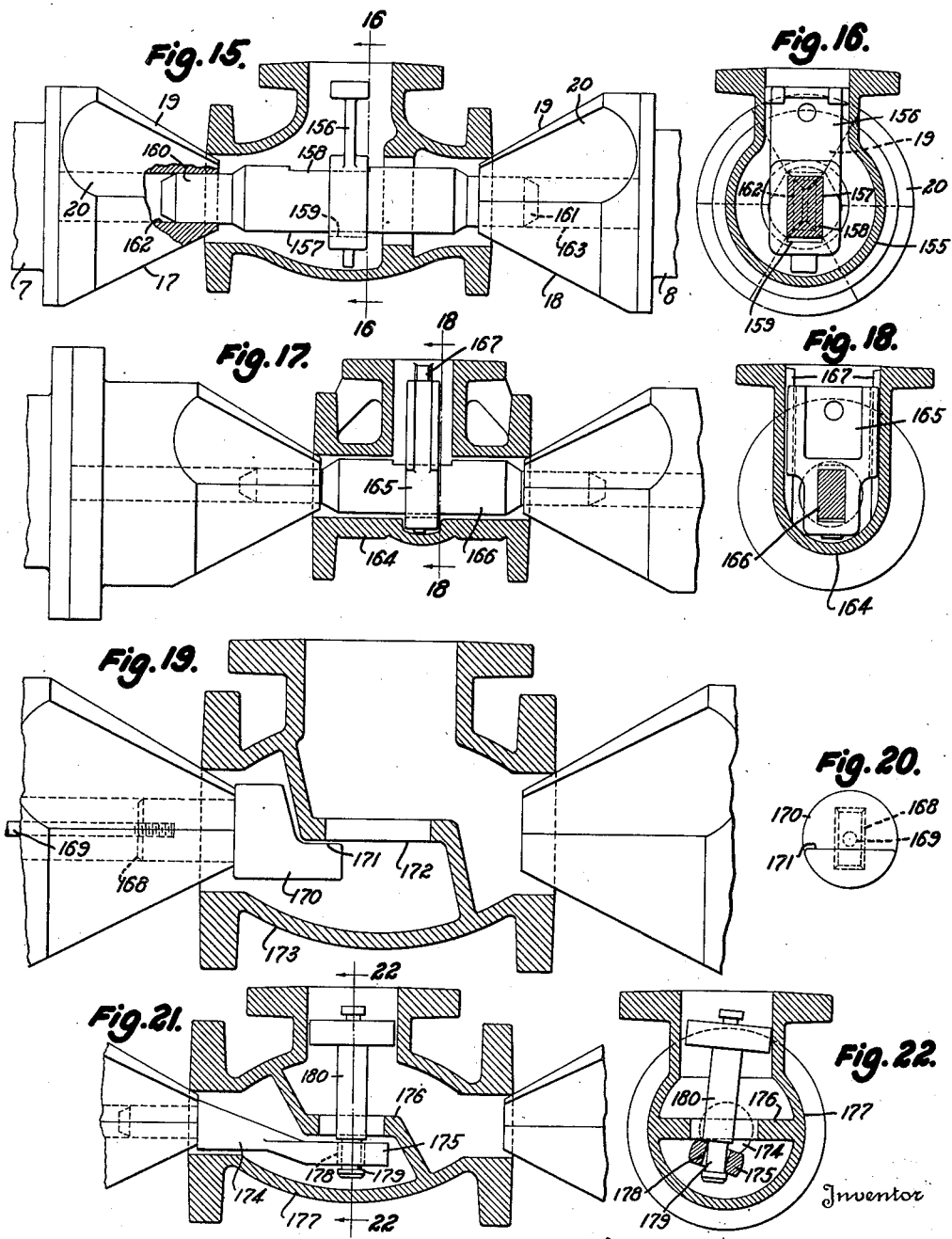

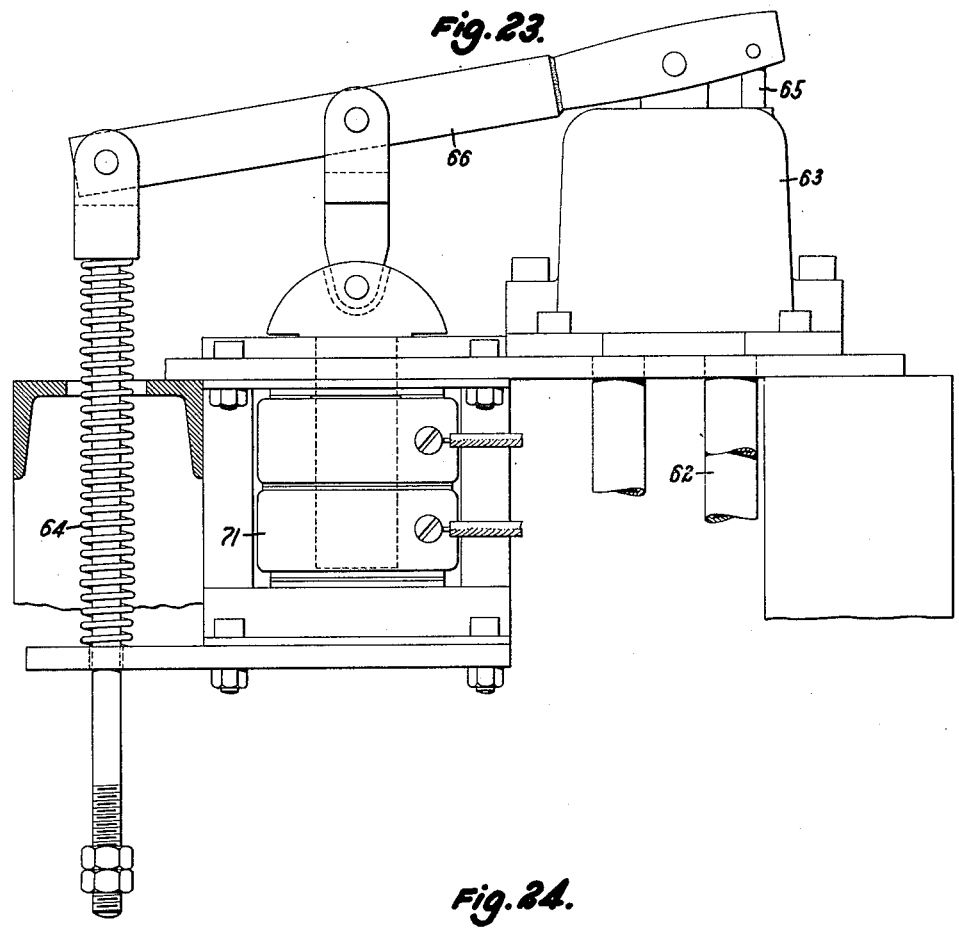
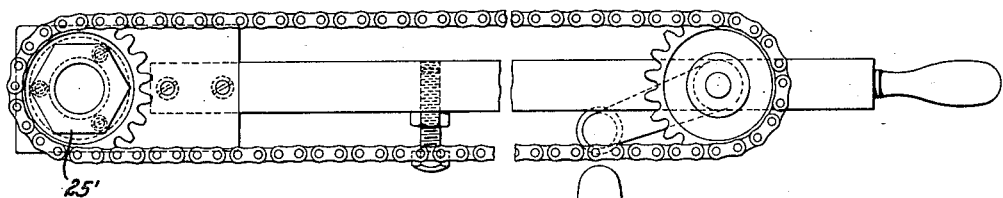
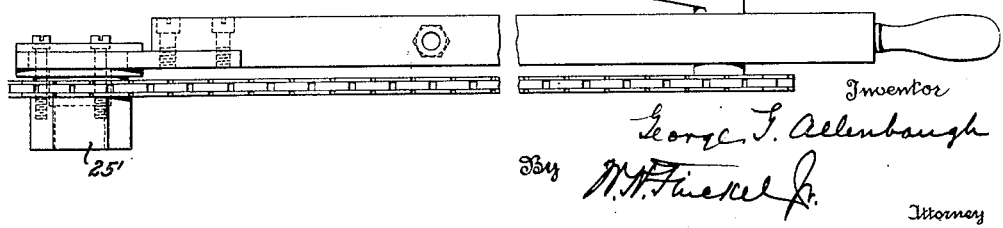

May 8, 1951 G. G. ALLENBAUGH 2,551,716
MACHINING APPARATUS
Filed Feb. 5, 1946 17 Sheets-Sheet 10

Inventor
George G. Allenbaugh
By N. N. Finckel Jr.
Attorney

May 8, 1951 G. G. ALLENBAUGH 2,551,716
MACHINING APPARATUS
Filed Feb. 5, 1946 17 Sheets-Sheet 11
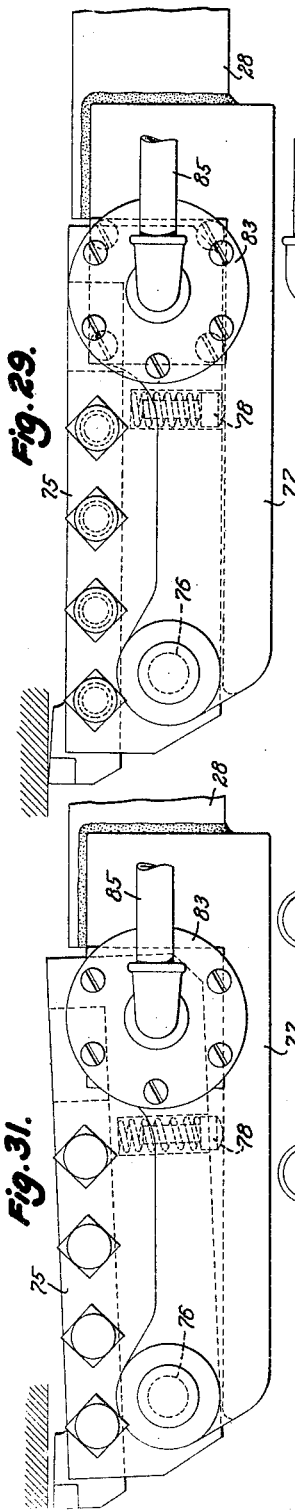
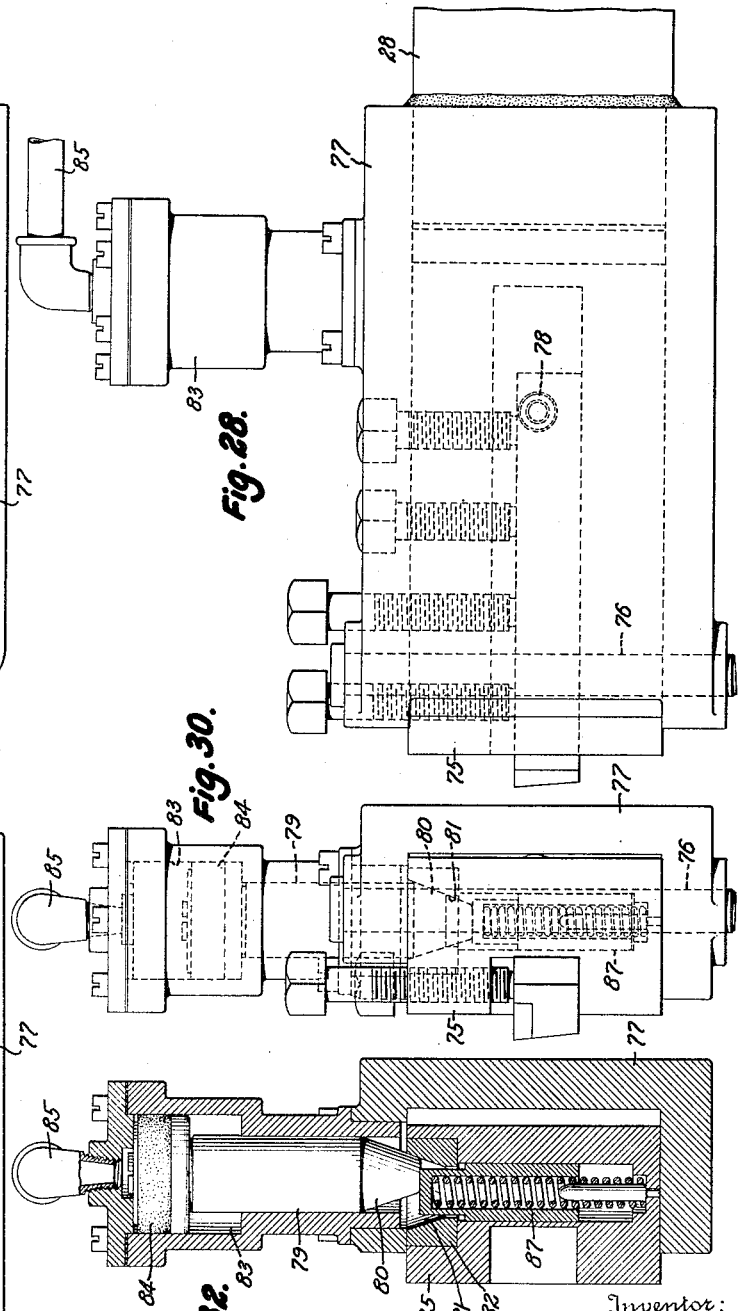
Inventor:
George G. Allenbaugh
By W. H. Finckel Jr.
Attorney.

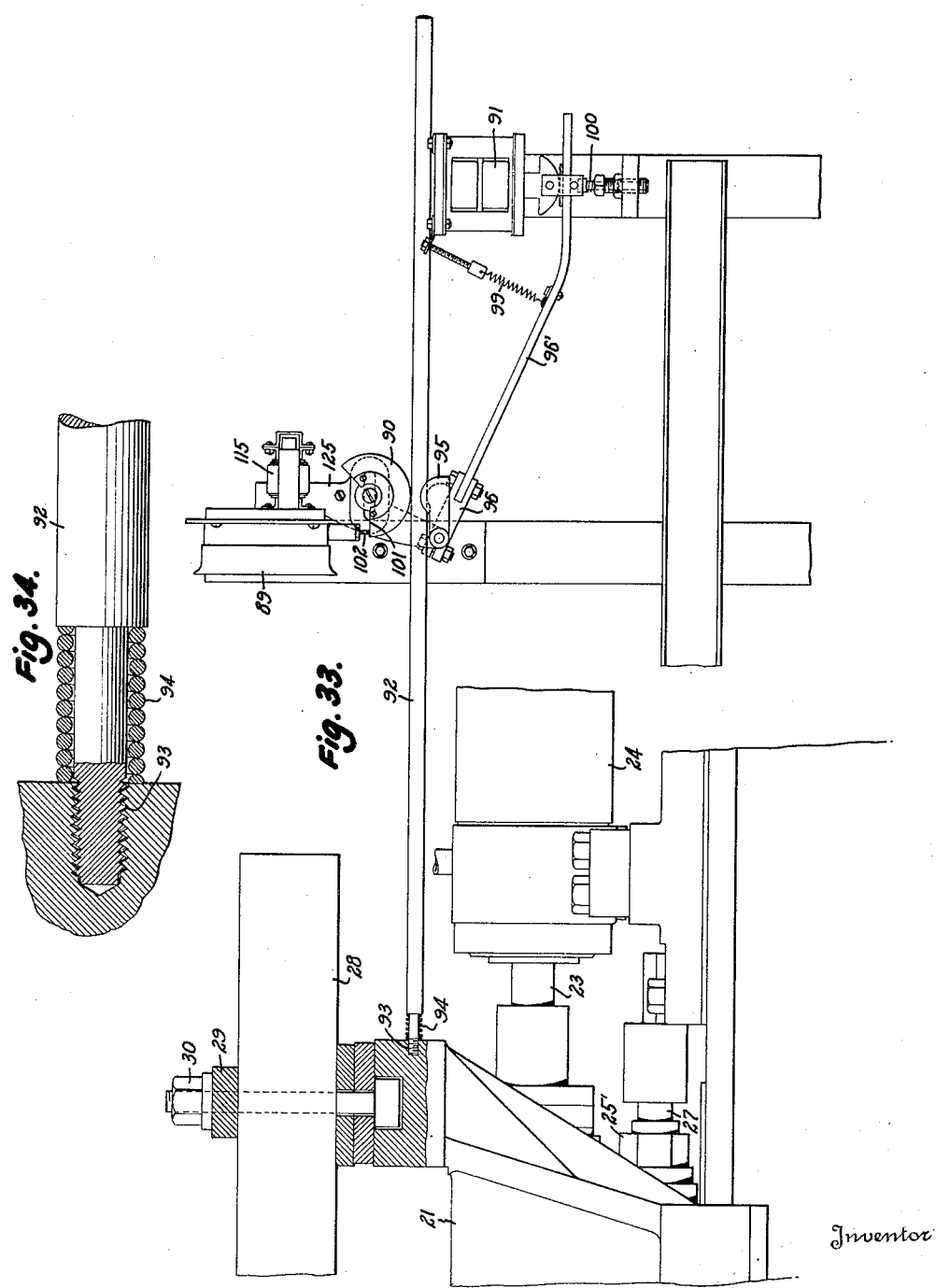

May 8, 1951     G. G. ALLENBAUGH     2,551,716
MACHINING APPARATUS
Filed Feb. 5, 1946     17 Sheets-Sheet 13
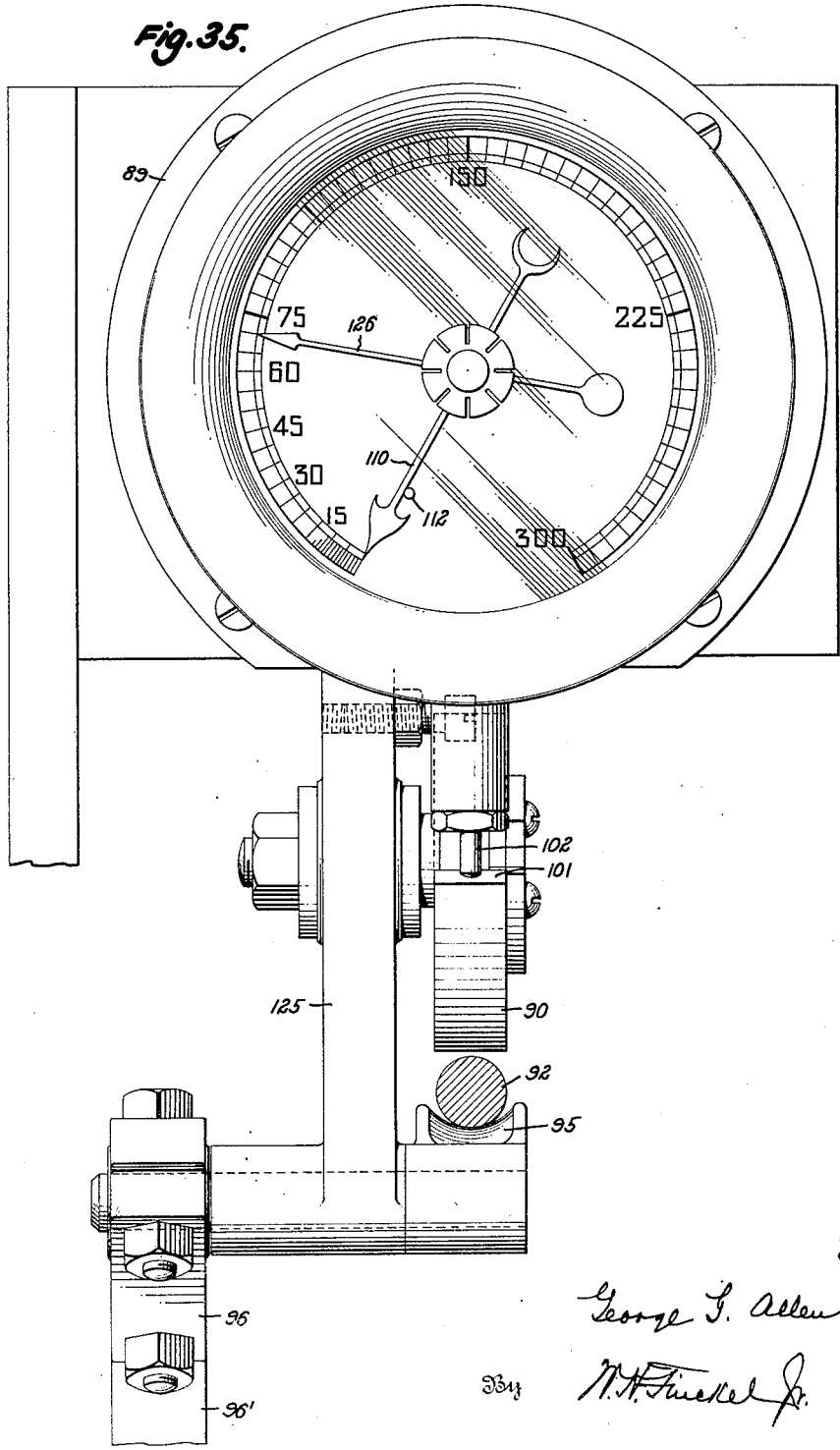

May 8, 1951 G. G. ALLENBAUGH 2,551,716
MACHINING APPARATUS
Filed Feb. 5, 1946 17 Sheets-Sheet 15

Inventor
George G. Allenbaugh
by N. N. Finckel Jr.
Attorney

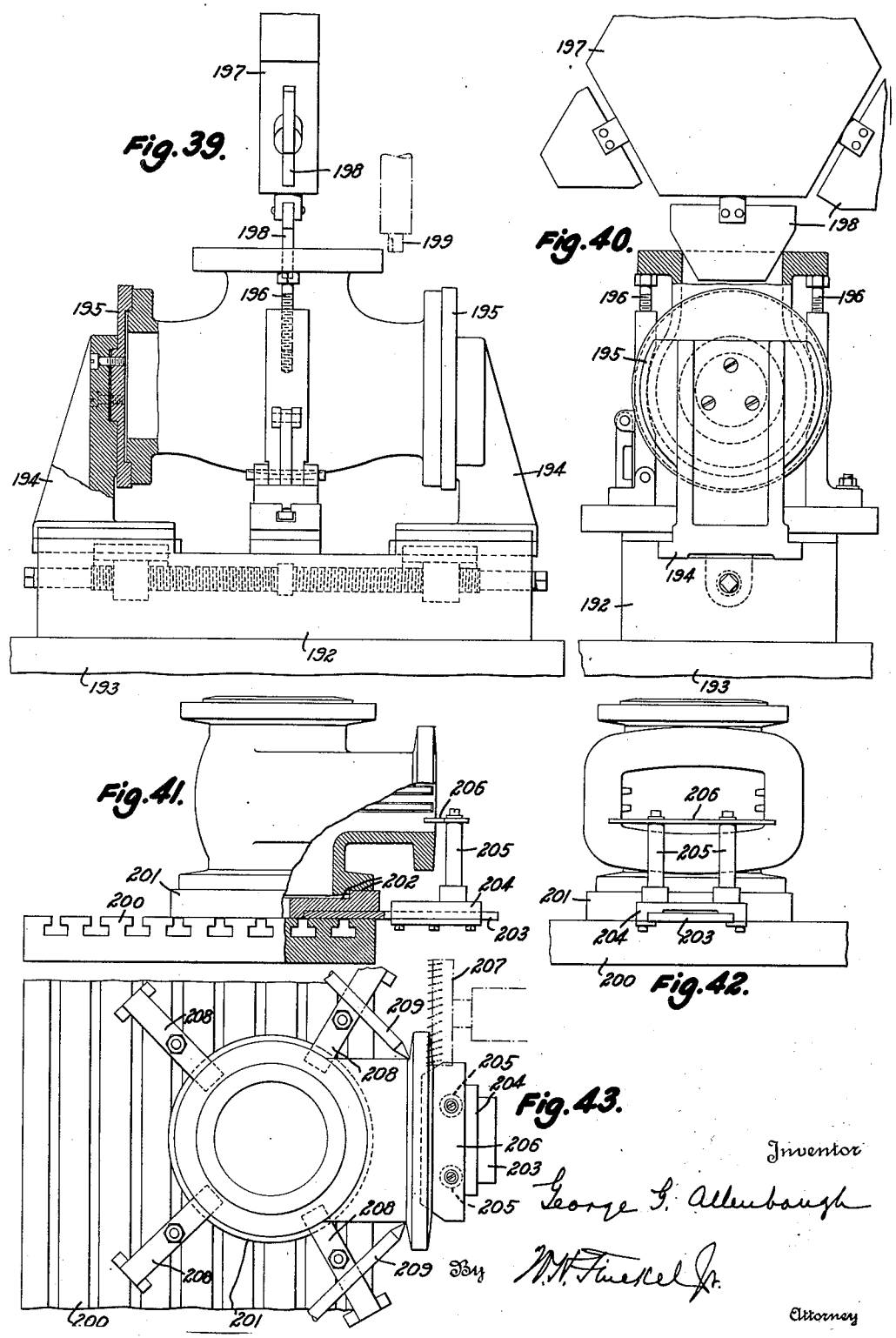

May 8, 1951  G. G. ALLENBAUGH  2,551,716
MACHINING APPARATUS
Filed Feb. 5, 1946  17 Sheets-Sheet 17
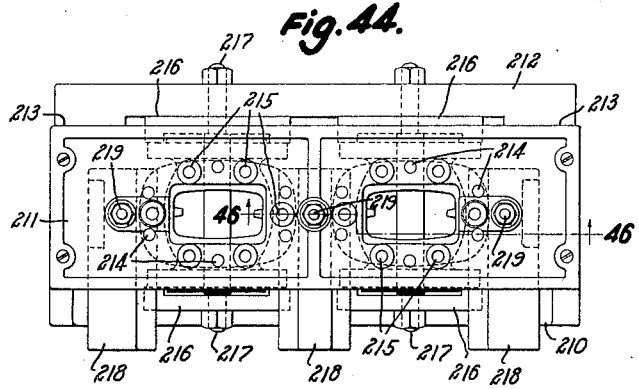
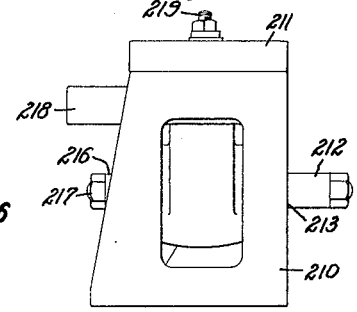
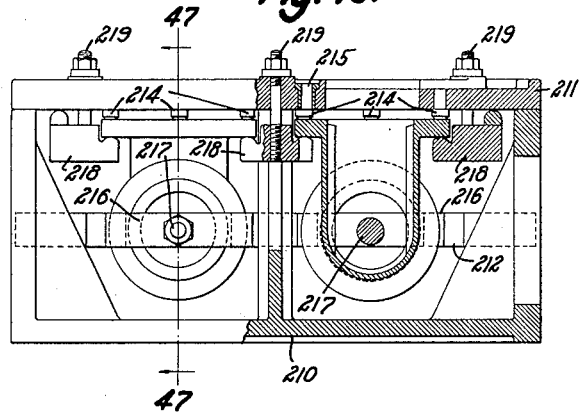
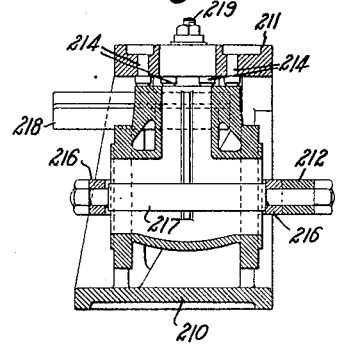
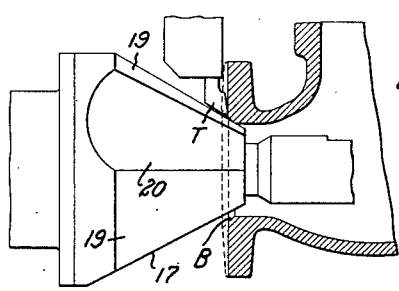
Inventor
George G. Allenbaugh
By W. H. Finckel Jr.
Attorney Patented May 8, 1951

2,551,716

UNITED STATES PATENT OFFICE 2,551,716

MACHINING APPARATUS

George G. Allenbaugh, Wadsworth, Ohio, assignor to The Ohio Injector Company, Wadsworth, Ohio, a corporation of Ohio Application February 5, 1946, Serial No. 645,638

5 Claims. (Cl. 82—2)

This invention relates to machining apparatus, and it has special reference to apparatus for machining cast valve bodies.

In the casting of valve bodies sand molds are ordinarily used, and the hollow interiors and communicating passages of the bodies are produced during the casting operation by accurately formed cores properly positioned in the mold cavities.

The contours and relative location of the hollow interiors and communicating passages of the bodies thus formed by the cores can be depended upon for accuracy, but the outer surfaces of the bodies, which are formed by the sand molds, may have various faults due to shrinkage, swelling and the like, which will impair their accuracy.

Heretofore, the outer surfaces of cast valve bodies have been relied upon to determine the machining operations necessary to finish the flanges and other machined parts, and as these outer surfaces may not, for various reasons as explained, be true to the inner, core-formed surfaces and openings, which are more important in ultimate assembly and functioning of the valves, the machining of the bodies in accordance with controls and gauging governed by the possibly inaccurate outer surfaces may, and often does, result in the scrapping of castings.

In accordance with the present invention apparatus is provided for machining the outer surface parts of cast valve bodies, such as the flanges, by reference to the accurate, core-formed interior surfaces, openings and ports thereof, including means for supporting, gauging, and positioning the valve bodies, and means for producing required cutting and drilling operations, together with manual and automatic control means operable during the various machining steps to insure accuracy and safety.

Moreover, the apparatus is designed to be so operable that two parallel flanges of a valve body, such as the line bolting flanges, may be accurately machined simultaneously, all as will be explained hereinafter more fully and finally claimed.

Figure 26:
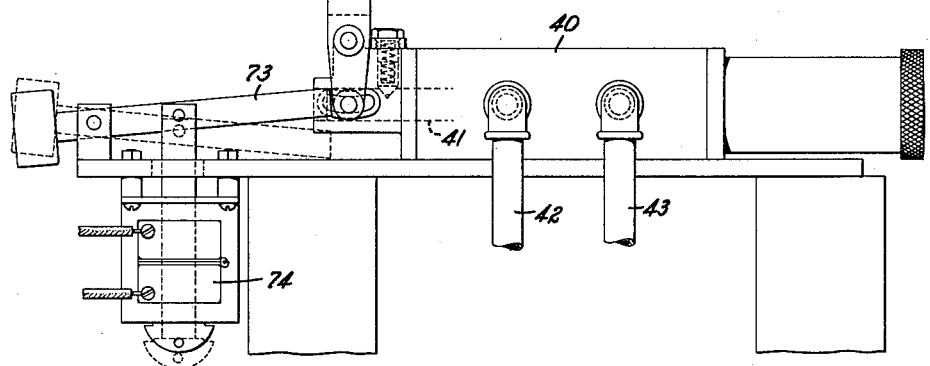
Figure 27:
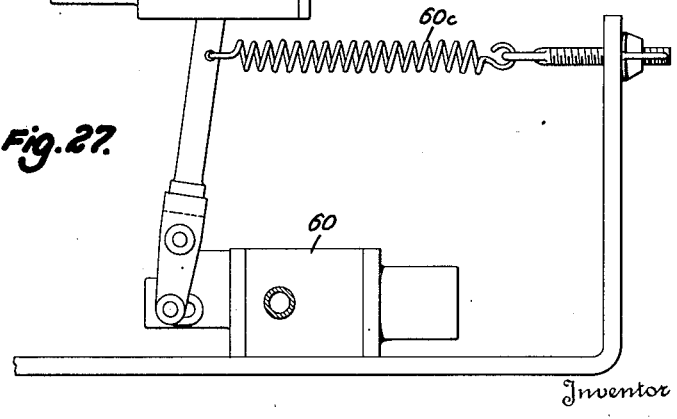
Figure 36:
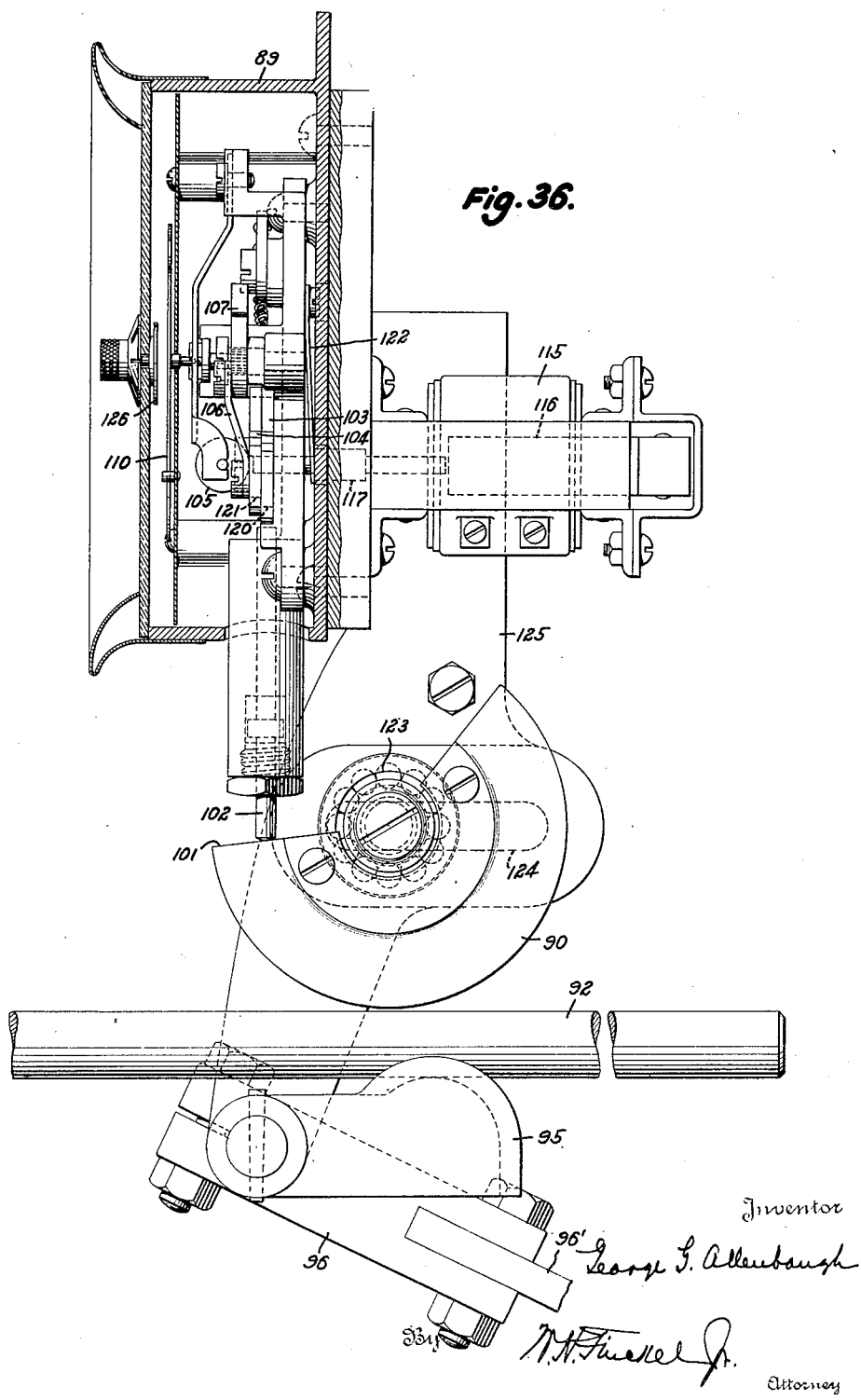
Figure 37:
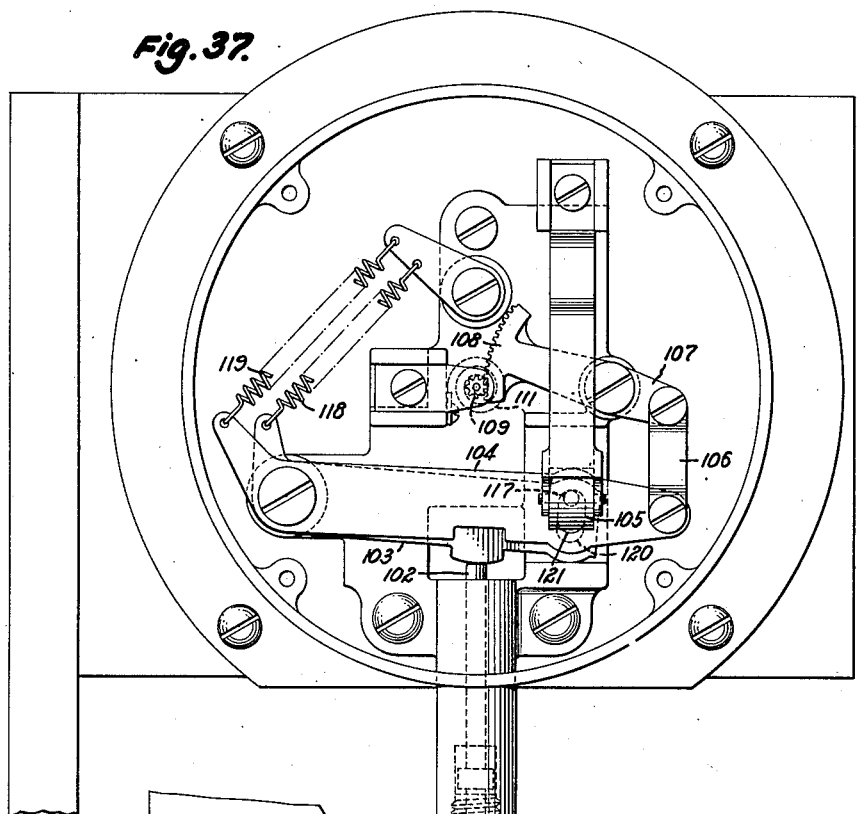
Figure 38:
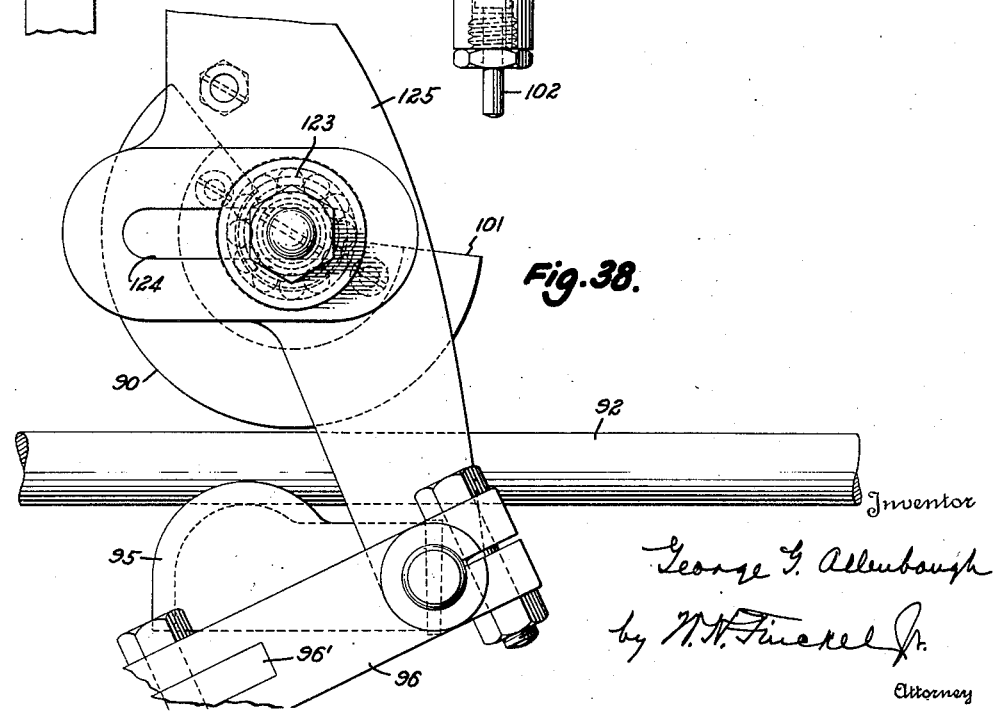

In the accompanying drawings illustrating the invention, in the several figures of which like parts are similarly designated, Fig. 1 is a schematic plan view of apparatus for the practice of the invention, showing the electrical and fluid-pressure controls therefor, certain mechanical means being omitted in the interest of simplicity of disclosure, Fig. 1a is a schematic plan view of the fluid-pressure system of the apparatus somewhat enlarged in respect to the showing of Fig. 1, Fig. 2 is a sectional side elevation of apparatus of the invention associated with and modifying a facing machine of known type, and showing a gate valve body in gauging position, Fig. 3 is a plan view, upon a larger scale, of apparatus of the invention, including the manually operated mechanical control means for certain of the fluid-pressure operated mechanisms, Fig. 4 is an enlarged, fragmentary plan view of parts of the control mechanism illustrated in Fig. 3, Fig. 5 is a sectional elevation taken on line 5—5 of Fig. 4, Fig. 6 is a sectional elevation taken on line 6—6 of Fig. 4, Fig. 7 is an enlarged front elevation, with parts in section, of the gauging head of the apparatus shown in Figs. 2 and 3, Fig. 8 is a side elevation of the parts shown in Fig. 7, Fig. 9 is a section on line 9—9 of Fig. 7, Fig. 10 is a fragmentary front elevation illustrating the operation of the gauging head of Figs. 7 to 9 upon a valve body supported upon the centers of the modified facing machine, Fig. 11 is a sectional elevation taken on line 11—11 of Fig. 10, Fig. 12 is a side elevation of a self-centering adapter or gauge block for use in the gauging of globe, check and angle valve bodies, Fig. 13 is a bottom plan view of the device of Fig. 12, the top view thereof appearing in the showing of Fig. 11, Fig. 14 is a view similar to Fig. 11, but showing the fingers of the gauging head in use upon a gate valve body, Fig. 15 is a sectional elevation of the centers of the machine with an angle valve body supported thereon, and appropriate driver and driver bar applied thereto, Fig. 16 is a section taken on line 16—16 of Fig. 15, Fig. 17 is a view similar to Fig. 15 but showing a gate valve body with appropriate driver and driver bar, Fig. 18 is a section on line 18—18 of Fig. 17, Fig. 19 is a view similar to Fig. 15 but showing a globe valve body and a driver of one type appropriate therefor, Fig. 20 is an end view of the driver shown in Fig. 19, Fig. 21 is a view similar to Fig. 19 but showing a form of driver and driver bar for use with globe valve bodies, Fig. 22 is a sectional elevation on line 22—22 of Fig. 21;

Fig. 23 is a fragmentary side elevation of a solenoid-responsive valve for controlling admission and exhaust of air pressure for adjusting the tool feed control of the machine, Fig. 24 is a side elevation of adjusting means for the tool carriage of the machine, Fig. 25 is a top plan view of the device of Fig. 24, Fig. 26 is a side elevation of the valve which controls fluid pressure for moving the tail stock of the machine, Fig. 27 is a side elevation of the valve which controls fluid pressure for rapid movement of the tool carriage of the machine, Fig. 28 is a side elevation of one of the tool carriers or bars of the machine, provided with means for relieving or permitting the tool to move away from the cut surface upon completion of the cut, Fig. 29 is a top plan view of the parts shown in Fig. 28, with the tool in cutting position, Fig. 30 is an end view of the parts shown in Fig. 28, Fig. 31 is a view similar to Fig. 29, but showing the tool moved away from the cut surface, Fig. 32 is an axial section taken through the actuating cylinder of the tool holder, with the parts in position as shown in Fig. 31, Fig. 33 is a fragmentary side elevation, with parts in section, of the rear end of the tool carriage of the machine, showing the operative association therewith of a feed indicating device, Fig. 34 is an enlarged fragmentary sectional side elevation of the flexible connection between the tool carriage and the actuating rod of the feed indicator, Fig. 35 is a front elevation of the feed indicator and associated operating mechanism, the actuating rod being shown in section, Fig. 36 is a sectional side elevation of the parts shown in Fig. 35, Fig. 37 is a front view of the feed indicator with the dial, hands and bezel removed to disclose the operating mechanism, Fig. 38 is a fragmentary side elevation of parts of the feed indicator operating mechanism viewed from the side opposite to that shown in Fig. 36, Fig. 39 is a front sectional elevation of appropriate gauging, positioning and supporting tools or jigs for performing the second machining operation upon globe valve, angle valve and check valve bodies, one such body being shown associated therewith, Fig. 40 is an end elevation, partly in section, of the parts shown in Fig. 39, Figs. 41, 42 and 43 are, respectively, a side sectional elevation, an end view and a plan showing appropriate gauging, positioning and supporting tools or jigs for performing the second machining operation upon gate valve bodies.

Figs. 44 and 45 are, respectively, a top plan view and an end elevation of appropriate tools or jigs for performing the third machining, or flange-drilling operation upon various types of gate valve bodies, two such bodies being shown associated therewith, Figs. 46 and 47 are sectional elevations taken upon the line 46—46 of Fig. 44, and the line 47—47 of Fig. 46, respectively, and Fig. 48 is a fragmentary sectional elevation illustrating a modification of the flange machining operation.

The machining of the exterior surfaces and parts of bolted-flange, cast-metal valve bodies, for which the apparatus of the invention is especially adapted, whether such bodies are of globe-valve, angle-valve, check-valve or gate-valve type, where there are two line bolting-flanges and a bonnet bolting flange, requires three main operations, namely, first the machining of the faces of two of said line bolting-flanges in parallelism and usually equidistant from the axis of the core-formed opening of the third flange, second the machining of the face of such third flange at right angles to the faces of the other two flanges and to the axis of its own opening, and, third the drilling of the bolt holes in the flanges. The second, third and other machining operations, such as the finishing of the valve seating surfaces of the bodies, may thereafter be performed with the bodies accurately positioned and supported by exterior surfaces already machined.

The first operation, which requires the supporting of the valve body, for rotation, by two of the cored openings which have a common axis, exactly locating it, as predetermined, between the two cutting tools which simultaneously machine the faces of the flanges of such two openings, and controlling the feed of the tools to the work, is performed semi-automatically by the apparatus illustrated in Figs. 1 to 38.

The second operation, which requires rigidly and accurately supporting the valve body by means cooperating with a surface, or surfaces, already machined in the first operation, properly positioning the flange of the third opening by reference to its associated cored opening, and machining such flange, is preferably performed upon the bodies of globe-valves, angle-valves and check-valves by the apparatus shown in Figs. 39 and 40, and upon the bodies of gate-valves by the apparatus shown in Figs. 41 to 43.

The third operation, particularly as regards the drilling of the bolt holes in the bonnet flange of gate-valve bodies, which requires the accurate positioning and clamping of the valve bodies for introduction into a multiple-spindle drilling machine, is performed by the apparatus illustrated in Figs. 44 to 47. In performing this third operation upon the bodies of globe-valves, angle-valves and check-valves, suitable clamping and supporting jigs embodying the essential positioning and clamping features of the apparatus of Figs. 44 to 47 may be used, or other supporting and clamping means may be used taking advantage of the already accurately machined surfaces for purposes of positioning and gauging.

Referring particularly to Figs. 1 to 22, it will be seen that a machine 1, such as the "Barrett Facer," having a head stock 2 and a tail stock 3 both of which are adjustably slidable upon a bed 4, is so modified as to especially adapt it to the embodiment of apparatus in accordance with the invention.

The head stock 2 is adjustable longitudinally of the bed 4 by means of a hand wheel 5 connected with gearing (not shown) of conventional nature, and the tail stock 3 is adjustable longitudinally of the bed under the influence of a hydraulic cylinder 6 which forms a part of the apparatus of the invention.

The spindles or arbors 7 and 8 of the head and tail stocks, respectively, are synchronously driven through gears (not shown) in the casings 9 and 10, respectively, through a longitudinal shaft 11 (Fig. 2) in the base 4 splined to carry pinions (not shown) which constantly mesh with the spindle-driving gears, all in a conventional manner.

The shaft 11 is selectively driven at any one of a number of speeds provided by a transmission gearing 12 through a clutch 13, belt means 14 and main driving motor 15, a brake 16 being provided, as is customary, to prevent undue rotation of the spindles 7 and 8 after the motor 15 is deenergized.

In accordance with the invention, the spindles 7 and 8 are fitted with similar "bull-head" centers 17 and 18, respectively, these centers being furnished in graduated shapes and sizes to accommodate various types or styles and sizes of valve bodies, and having circumferentially spaced lands 19 and flats 20 to provide for their proper supporting and driving engagement, with the cored openings of a valve body mounted between them, as will be explained in detail hereinafter.

The tool carriage 21 slides upon the ways 22 of a bed extending at right angles to the machine bed 4 and having its longitudinal axis substantially midway of the length of the machine bed. This tool carriage is moved longitudinally of the ways 22, by means of a bar 23 and hydraulic cylinder 24. Its forward movement, or advance to the work, is limited by an adjustable stop nut 25 capable of actuation from the front of the machine by a long-shanked crank (not shown), and its rearward, or retracting movement, is limited by a stop nut 25', capable of actuation from the rear of the tool carriage by a chain and sprocket crank mechanism 26 shown in Fig. 2, and illustrated in detail in Figs. 24 and 25. Both of the stop nuts 25 and 25' are threaded upon a fixed rod 27.

The tool bars 28 are longitudinally and laterally adjustable upon the tool carriage by conventional slidable clamping plates and bolts 29 and 30, respectively (Figs. 2 and 3).

Mounted on standards 31 carried by the tool carriage is a longitudinally slidable square (or otherwise non-cylindrical to prevent rotation) rail 32 which carries at its forward end the gauging device or head 33 later to be described. Projection and retraction of the rail 32 and with it of the gauging device may be accomplished either manually (for preliminary adjustment) or automatically, and for the latter purpose an air cylinder 34 is provided under control of a valve 34'.

Hydraulic pressure for actuating the cylinder control and feed means 6 and 24 and tool relieving means later to be described, is furnished by an oil pump 35 (Figs. 1, 1a and 3) driven by a motor 36 and drawing oil from a storage tank 37. The pressure at which the oil is fed from the pump 36 to the cylinders of the feed and control means is governed by suitable manually-adjustable valves which will be referred to more in detail hereinafter.

Compressed air for operating various controls is supplied from a suitable source through a pipe 38 (Figs. 1 and 1a).

The various electrical circuits, as shown in Fig. 1, for supplying power to motors and solenoids used in the operation and control of the apparatus are fed from the line 39, and switches of both manually and automatically operated types are employed therein, as will be explained later herein.

Referring to Figs. 1, 1a, 3 to 6, 23, 26 and 27, it will be seen that hydraulic pressure is piped from the pump 35 to various valves within the control of the operator.

The valve 40 which controls the supply of hydraulic pressure to cylinder 6, for moving the tail stock 3 of the machine, is of the type shown in Fig. 26, and is a multiway valve having a sliding plunger 41 controlling ports piped at 42 and 43 to the left and right ends (Figs. 1 and 1a) of this cylinder, and ports piped at 44 to the pump 35 and at 45 and 46 to a return to the oil storage tank 37. It will be noted (Figs. 1 and 1a) that inasmuch as the pipes 42 and 43 serve for both inlet to and exhaust from the cylinder 6 they are provided with by-pass branches 47 and 48 furnished with flow adjusting valves, and check valves are provided to insure passage of the hydraulic pressure from the valve 40 through the flow adjusting valves on its way to the cylinder 6.

The plunger 41 of valve 40 is moved by a lever arm 49 connected by a link 50 with a slidable handle member 51 at the front of the machine within easy reach of the operator. When handle member 51 is pulled toward the operator the tail stock 3 will be moved to the left, and when the handle member is pushed away from the operator the tail stock will be moved to the right. An intermediate or neutral position locks the tail stock in any desired adjusted position.

A multiway valve 52 similar in construction to the valve 40 serves to control the supply of hydraulic pressure to the cylinder 24 which moves the tool carriage. The lever arm of this valve, like the similar arm 49 of valve 40, is connected through a link 53 with a handle member 54. When the handle member 54 is pulled toward the operator the tool carriage will be advanced to the work at a rate for "fine feed" as determined by the setting of the needle valve 55. This needle valve has its adjusting handle 56 connected with an operating rod 57 extending to within reach of the operator, a pointer 58 on the handle travelling over a dial 59 appropriately graduated to indicate rate of feed within appropriate limits as will hereinafter appear. When the handle 54 is pushed away from the operator the tool carriage will be retracted. An intermediate or neutral position of the handle 54 will stop and hold the tool carriage in any desired position of feed or retraction.

Working in conjunction with valve 52 is a third valve 60 (Figs. 1, 1a, 3 to 6 and 27) which receives hydraulic pressure from valve 52 when the latter is in "fine feed" position. Thus, when valve 60 is opened to receive pressure fluid from valve 52, hydraulic pressure will by-pass the needle valve 55 and pass directly to the cylinder 24 for "rapid approach" of the tool carriage to the work. This valve 60 is controlled in a manner similar to the valves 40 and 52 by a link 60a and handle member 60b. As long as the handle is held pulled toward the operator, "rapid approach" of the tool carriage will take place, but when the handle is released, a spring 60c will return the valve to closed position, and "fine feed" through control of valve 52 and needle valve 55 will be reestablished. As indicated in Figs. 1 and 1a, needle valves and check valves, similar to those in the pipe lines 42 and 43 of valve 40, are provided in the pipe lines of valves 52 and 60, the needle valve 55 constituting one of such valves.

Since there is no direct mechanical tie between the drive of the spindles 7 and 8 and the tool feeding mechanism, a safety device is included in the electric circuits and valve controls for the purpose of preventing feeding of the cutting tools while the spindles are stationary.

Referring to Figs. 1, 1a, 3 to 6 and 23, it will be seen that valve 52 is equipped with an air cylinder 61 the piston of which abuts against the inner extended end of the plunger of the valve. Air is admitted to and exhausted from the cylinder through a pipe 62 from a conventional 3-way air control valve 63, Fig. 23. The valve 63 is opened to supply and closed to exhaust by a spring 64 through a link and lever mechanism 65, 66.

As long as the main motor 15 is energized, the clutch 13 is engaged by operation of the handle 67 which closes the limit switch 68, and the handle member 54 is pulled forward to "fine feed" position which, by means of a lug 69 (Figs. 3 and 4) closes a switch 70 (Figs. 1, 3 and 4), a solenoid 71 (Figs. 1 and 23) will be energized and will hold the operating lever 66 of the air valve 63 in the position shown in Fig. 23, in which air is cut off from the air cylinder 61 of valve 52, thus permitting the valve 52 to remain in adjustment for "fine feed" of the tool carriage. If, however, the circuit of the solenoid 71 is interrupted by the opening of either switch 68 or switch 70 or the main motor switch 72, the spring 64 will cause the air valve 63 to open, admitting air to the air cylinder 61 and forcing the plunger of valve 52 to neutral position, thus stopping feeding movement of the tool carriage.

It will be apparent that when the main motor 15 is again energized and clutch 13 engaged to drive the spindles, it will be necessary in order to again set the valve 52 for "fine feed" that the operator exert sufficient pull upon the handle member 54 to overcome the air pressure in the cylinder 61 until the switch 70 is closed, thus energizing the solenoid 71 and closing the air valve 63 to supply, and opening the cylinder 61 to exhaust.

Referring to Figs. 1, 1a, 4 and 26, it will be noted that the valve 40, which controls movement of the tail stock 3 through the hydraulic cylinder 6, is provided with a latch 73 held in the position shown in Fig. 26 by a solenoid 74 in circuit with the switch 72 of the main motor 15 so that, after the machining operation has been started with the tail stock locked in adjusted position and the plunger of valve 40 set in neutral, the valve 40 cannot be operated to move the tail stock to the right (Figs. 1 and 1a), thus guarding against the release of the valve body held between the centers 17 and 18 when the spindles 7 and 8 are driven.

Inasmuch as the tools used with the apparatus are preferably of the type furnished with cutting points of tungsten-carbide, which is very brittle and will not stand much of a tensile stress, the tool bars 28 may, if desired, be provided with automatic means for relieving or disengaging the tips of the tools from the work upon completion of the cut, thus avoiding possible injury to the tips due to normal springiness of the tool bars, which might be caused by dragging them over the cut surface during retraction.

Means appropriate for this purpose are shown in Figs. 1, 1a, 2 and 28 to 32. In the mechanism here disclosed each tool bar is provided with a tool clamping block 75 pivoted at 76 in a jaw member 77 formed upon the forward end of the tool bar. The clamping block 75 is normally forced to tool-relieving position (Figs. 31 and 32) by a spring-actuated plunger 78, and is held rigidly in cutting position (Figs. 28, 29 and 30) by a hydraulically operated plunger 79 the conical end 80 of which engages the complemental socket 81 of a hardened insert 82 in the tool clamping block 75. The cylinder and piston means 83, 84 of each plunger 79 is connected through a pipe 85 and flexible hose 86 with the "fine feed" control valve 52 in such manner that when the valve 52 is set for "fine feed" the tool clamping blocks will be locked in cutting position by interengagement of the cone and socket means 80, 81. When the valve 52 is adjusted for tool retracting the cone and socket means will be released under the influence of a spring-pressed dog 87 and the spring-actuated plunger 78 will shift the tool carrying block to move the tip of the tool away from the work (Figs. 31 and 32).

In addition to its function in guarding against injury to the cutting tips of the tools, this mechanism will also prevent the production upon the cut surfaces of any mark sometimes caused by retraction of the tools.

If this mechanism is incorporated in the apparatus, it will be apparent that in adjusting the machine for work upon a particular size and style of valve, as hereinafter described, it will be necessary to lock the tools in cutting position while the adjustment is made. Due to the fact that the tools are thus locked only when the valve 52 is set for "fine feed," it is obvious that means must be provided for holding the valve 52 in such condition during the adjusting operation. To this end a clamping screw 88 (Figs. 3, 4 and 6) is provided for engagement with the shank of the handle member 54 of the valve.

As hydraulic power supplied by the pump 35 is employed through the cylinder 24 for imparting tool-feeding movement to the tool carriage 21, and inasmuch as in any hydraulic system where oil under pressure is circulated as a power medium, and is subject to variations in temperature, and hence in viscosity and flow characteristics, some means must be provided to insure a predetermined constant rate of feed of the cutting tools regardless of changes in flow characteristics of the pressure oil. The rate of feed, whereby the quality of the work and the cutting time are measured, is controlled by the needle valve 55 which will pass a given volume of oil at a given temperature (approximately 120° F.) into the cylinder 24. After a lapse (say over night) in operation of the apparatus it takes about three hours of operation for the oil to reach its peak operating temperature, and during this "warming-up period" the needle valve 55 must be adjusted from time to time to maintain a substantially constant rate of feed of the tools. The setting of the valve during this period of adjustment may be read upon the scale 59 as indicated by the pointer of hand 58 (Fig. 4). For example, this scale may read a quarter segment from "0" to "90," and with oil at 80° F. (say after overnight lapse) the setting would be "45" to give a rate of tool feed of about .003" per revolution of the machine spindles 7 and 8, whereas with the oil temperature at 120° F. (following the warm-up period, and for normal operation) the same rate of feed will be maintained with a setting of "22".

In order that the rate of feed may be read at any time during operation of the machine, so that the needle valve 55 may be properly adjusted, a feed indicator mechanism is preferably included in the apparatus, as shown in Figs. 1, 3 and 33 to 38.

This apparatus is covered by applicant's Patent No. 2,535,826, granted on December 26, 1950.

This mechanism includes, as main units, an indicator gauge 89, a cam device 90 and a solenoid 91, all of which are provided with mechanism whereby feeding movement of the tool carriage is indicated upon the gauge 89 in thousandths of inches per revolution of the spindles 7 and 8, "15" on the gauge indicating .015" and so on up to .300". Of course, any other desired scale designations may be employed as desired.

Referring particularly to Figs. 1, 3, 33 and 34, it will be seen that the cam device 90 is arranged above a somewhat flexible rod 92 connected with the rear end of the tool carriage 21 by a loosely threaded connection 93 (Fig. 34) backed up by a compression spring 94, thus allowing for a certain amount of relative lateral movement while preventing any relative axial movement between the carriage and rod.

In periods of rest the length of the rod is supported in an eccentric pivoted bearing member 95 provided with a lever arm 96, and is out of contact with the cam device 90, but when it is desired to take readings the starter button 97 of the control switch 98 (Fig. 1) is depressed to energize the solenoid 91 which, through the bar 96' and lever arm 96 raises the bearing member 95 against the rod 92 and forces the rod into frictional engagement with the cam device 90 sufficient, when the tool carriage is feeding, to cause rotation of the cam device. A buffer spring 99 is provided, and the extent of opening travel of the solenoid core is limited by means of an adjustable spring-pressed stop plunger 10.

Having reference particularly to Figs. 35 to 38, it will be seen that the step 101 of the cam device 90 bears against the lower end of a plunger pin 102 the upper end of which engages the lug of a lever 103 in face-to-face frictional engagement with a lever 104 under the influence of a spring-pressed roller 105. The lever 104 is connected through a link 106 with one end of a substantially centrally pivoted lever 107 the other end of which is provided with a segmental gear 108 meshing with the pinion 109 on the arbor of the indicator hand 110. A hair spring 111 normally acts to bias the indicator hand 110 to position against an appropriate stop 112.

In operation, when the cam device 90 is caused to rotate by movement of the rod 92 in response to feed of the tool carriage, the step 101 will cause the plunger pin 102 to rise carrying with it the lever 103 which, in turn by frictional engagement, moves with it the lever 104 to cause rotation of the indicator hand 110 through the link 106 and lever-actuated gearing 108, 109.

After a reading has been taken, in a manner later to be explained, the parts may be reset to the position shown by depressing the stop button 113 of the control switch 98 to de-energize the solenoid 91. Thereafter, the reset button 114 of the switch 98 is depressed to energize a solenoid 115 at the back of the indicator gauge 89, the core 116 of the solenoid then pressing against one end of a trip pin 117 to shift the pin axially so that its other end will press the roller 105 away from lever 104 and thereby release the frictional engagement of this lever with the lever 103, whereupon the levers 103 and 104 will be returned to normal position under the influence of their respective return springs 118 and 119, the indicator hand 110 meanwhile being returned against the stop 112 by the action of the gearing 108, 109 and the hair spring 111. It will be noted that the levers 103 and 104 are provided with mating apertures 120, 121, respectively, for passage therethrough of the trip pin 117. A spring 122 (Fig. 36) normally holds the trip pin out of engagement with the roller 105 and in operative relation with respect to the core 116 of the solenoid 115.

In operation, when the operator wishes to check the rate of feed of the tool carriage, he first presses the stop button 113 of the control switch 98 to make sure that the solenoid 91 is de-energized. Then, with the machine loaded with a valve body and running in "fine feed" by appropriate setting of the control handle member 54 of the feed control valve 52, he presses the reset button 114 of the control switch 98 to insure that the indicator hand 110 is against the stop 112 and the other parts of the indicator gauge mechanism are returned to normal position.

He then presses the starter button 97 of the control switch 98 to energize the solenoid 91 and establish driving engagement of the parts including the cam device 90, rod 92 and bearing member 95, and thereafter again presses the reset button 114 and holds it until the valve body rotating with the machine spindles reaches some arbitrary point easily noted whereupon the reset button is immediately released. On completion of ten revolutions of the valve body the stop button 113 is pressed.

Obviously, the amount of travel of the tool carriage which has taken place during the ten revolutions of the valve body will be indicated by the indicator hand 110, and the operator can thereby read directly upon the scale of the dial plate, in thousandths of an inch, the distance travelled by the tool carriage during ten revolutions of the machine spindles, and can thereby determine the travel during one revolution.

The rotative bearing 123 of the cam device 90 is adjustably mounted in a slot 124 of its bearing bracket 125 so that it may be shifted to bring any desired effective area of its step 101 into operative engagement with the plunger pin 102, thus making possible calibration of the mechanism to give a direct dial reading in thousandths of an inch of tool travel.

In checking the rate of tool feed, supposing that the operator desires to feed at the rate of .007" per revolution of the machine spindles, he will set the pilot hand 126 (Figs. 35 and 36) of the gauge 89 at "70" on the dial scale, and then when he takes a reading, in the manner just described, ten revolutions of the spindles should cause the indicator hand 110 to register at "70" with the pilot hand 126. If the indicator hand goes beyond or falls short of "70," the needle valve 55 will be closed or opened more accordingly.

During the "warm-up" period hereinbefore referred to readings of the rate of tool feed can be taken frequently and the needle valve 55 adjusted to keep the tools feeding correctly within reasonably close limits.

It will be understood that the pressure of the roller 105 against the levers 103 and 104 serves not only to provide driving frictional engagement between these levers but will hold them against the mounting plate of the gauge mechanism with sufficient friction to maintain any reading of the indicator hand 110 until the reset mechanism is operated, the return springs 118 and 119 being merely of a strength thereafter to return the parts to normal position.

The centering gauge 33 and its complemental accessories will now be described, having reference particularly to Figs. 1 to 3 and 7 to 14.

As hereinbefore explained this gauge is mounted upon the forward end of a non-cylindrical rail or bar 32 slidably carried upon standards 31 supported by the tool carriage 21. The frame 127 of the gauge is secured to the bar 32 by a clamp 128 and is provided with ways 129 and 130 in which a vertically adjustable slide 131 is mounted, the rear side of the slide carrying a rack 132 engaged by a pinion 133 having its bearings in the frame 127 and being operable to adjust the slide by a crank handle 134. The extent of lowering movement of the slide is adjustably limited by a stop screw 135, and it is adapted to be held in any desired adjustment by a shoe 136 mounted in the way 130 and backed by a spring 137 the effective pressure of which is determined by a hand screw 138. When a desired range of movement of the slide has been determined, the crank handle 134 may be so adjusted upon the shaft of the pinion 133 by means of the cone clutch arrangement 139 (Fig. 7) as to bring it into readily-grasped position.

A gauge holder 140 is pivotally suspended in bearings 141 from the lower end of the slide 131. This gauge holder is provided with a pair of arms 142, 143 pivoted at 144, 145, respectively, and pressed toward each other by pins 146, 147 backed by springs 148, 149. These arms are fitted with removable gauging fingers 150, 151, respectively, the proximity of the ends of which may be adjusted, as desired, by a screw-adjusting cone 152 (Fig. 9) between and engaged by adjacent faces of the arms 142, 143.

As shown in Figs. 10 to 13, during the gauging operation, the fingers 150, 151 are made to engage with the pin 153 of a gauge block 154 so designed as to be self-centering in the side opening of a globe-valve, angle-valve or check-valve body. In using the fingers on gate-valve bodies having a single guide rib for the gate wedge they are adjusted to engage the outer faces of this rib, as shown in Figs. 2 and 14. Where the gate-valve body has a pair of parallel ribs to guide the wedge the fingers will be adjusted to engage the adjacent inner faces of the two ribs.

Having in mind the foregoing broad disclosure of the major operating elements of the apparatus, it is thought that an understanding of the means for gauging the valve bodies, and other details, will best be had from a description of the operation.

It will be understood that valve bodies of all sizes and styles to be machined will, prior to use of the apparatus of the invention in normal production, have been accurately machined for service as templates so that the various mechanisms and parts of the apparatus may be given a preliminary adjustment to accommodate it for operation upon valve bodies of a particular size and style.

It should be understood, also, that various types of coupling means are provided for furnishing driving connection between the synchronously driven centers 17 and 18 and the valve bodies to be machined, depending upon whether such bodies are of globe-valve, angle-valve, check-valve or gate-valve style. In this connection reference is made to Figs. 15 to 22.

In Figs. 15 and 16 is shown an angle-valve body 155 and a driver 156 and driver bar 157 for mounting the body in driving relation upon the centers 17 and 18. The driver bar 157 has a central portion 158, preferably of rectangular shape in cross section, which assumes a driving fit in a similarly shaped opening 159 through the driver 156, and its ends 160, 161, which are also rectangular in cross section, are made to engage with complemental sockets 162, 163 in the centers 17 and 18, respectively.

In Figs. 17 and 18, in which a gate-valve body 164 is shown, the driver 165 and driver bar 166 are similar to those illustrated in Figs. 15 and 16, but the driver is so modified as to provide for its proper engagement with the gate wedge guide ribs 167 of the valve body.

Figs. 19 and 20, and 21 and 22, show, respectively, two embodiments of driving means suitable for use with globe-valve bodies. In Fig. 19 the driver bar 168 is secured in the center 17 by a rod 169 extending through the spindle of the head stock, and carries a head 170 (Fig. 20) provided with a shoulder 171 for engagement beneath the seat web 172 of the valve body 173.

In Figs. 21 and 22 the driver bar 174 is provided with a tongue 175 which extends beneath the seat web 176 of the valve body 177 and has an opening 178 to receive the end 179 of the driver 180. In this form of driver and driver bar, it will be noted by reference to Fig. 22 that initial relative movement between these parts locks them together and prevents the driver from falling out of the valve body.

Furthermore, it will be seen by reference to Figs. 2, 15 and 16 that the centers 17 and 18 are preferably provided with three lands 19 and three flats 20, and that the sockets 162, 163 for the ends of the driver bars 157, 166, 168 and 174 are so formed that the axis of their longer cross-sectional dimension lies on a diameter bisecting a land and a flat. The advantages of this construction will be apparent from the following description of their use.

In the operation of the apparatus it will be apparent that, due to the variety in sizes and styles of valve bodies to be machined, adjustment of the various mechanisms to accommodate a particular size and style of valve body must be made prior to use of the apparatus in the machining operation.

As a preliminary to adjustment of the various mechanisms, the following steps should be taken by the operator, say for a 4″ angle-valve body:

Operation of the hydraulic pump 35 is started, by depressing the starter button 181 of the switch 182 for pump motor 36.

The proper speed for the machine spindles 7 and 8 is selected by adjustment of the control handles 12′ of the transmission 12.

The clutch 13 is engaged and the limit switch 68 closed by shifting of the handle 67.

The proper centers 17 and 18 for the size and style of valve to be machined are selected and applied to the spindles 7 and 8, and then by manipulation of forward, reverse and stop buttons 183, 184, 185, respectively, of the main motor switch 72, the spindles are jogged to make sure that the sockets (162, 163, Figs. 15 and 16, for example) of the centers have their longer cross-sectional axes arranged vertically with the associated lands 19 at the top.

The tool carriage 21 is retracted by manipulation of the valve 52, by means of the handle member 54, to provide sufficient clearance between the cutting tips of the tools and the peripheries of the flanges of the valve body to be machined when such body is mounted between the centers 17 and 18.

The stop nut 25′ is run up against the rear end of the tool carriage while it is in this retracted position.

The tool bars 28 are released, by loosening the clamping means 29, 30, and moved out of the way.

Proper cutting tools are selected and clamped in the sockets of the tool bars.

The air pressure regulators 186, 187 are set to provide a feed of compressed air at 45# to 50# as shown by their respective gauges 188, 189.

The centering gauge 33 is retracted by pushing the handle of valve 34' to the position shown in Fig. 1 to thereby admit air under pressure to the forward end of cylinder 34, after which the clamp 190 (Figs. 2 and 3) is released by loosening the clamping screws 191.

The proper driver and driver bar, and gauge block 154 (if the latter is required for the type of valve to be machined) are selected and placed within easy reach of the operator.

Thereafter, the following operations are performed in the order given.

The appropriate template body is positioned upon the centers 17, 18 as shown in Figs. 10 and 11, any driver and driver bar being omitted due to the fact that the template body has already been accurately machined and does not need to be driven.

The spindles 7 and 8 are jogged forward slightly (5° to 10°).

If the template body is a globe-valve, angle-valve or check-valve body, an appropriate gauging block 154 is next set in place in the side opening of the body, the axis of which now stands substantially vertical. In setting the block 154 in place one of the lands of its periphery should face the operator, as shown in Figs. 10 and 11.

The gauging head 33 is pulled forward (toward the operator) by means of the handle 128', Fig. 7, until the depending gauging fingers 150, 151 are directly above the pin 153 of the block 154.

The stop screw 135 is backed away and then, by operation of the crank handle 134, the slide 131 of the gauging head is adjusted to such a height that the lower ends of the gauging fingers can swing clear of the upper face of the gauging block 154 by about ¼", whereupon the stop screw 135 is run down against its contact plate on the frame 127.

The handle of valve 34' is pulled toward the operator, thus admitting air to the rear end of cylinder 34 and driving the piston all the way into the cylinder, the clamp 190 meanwhile sliding forward upon the bar of shaft 32. Thereafter the clamping screws 191 are tightened to fix this adjustment of the clamp 190.

Then the template body is moved endwise (axially with the centers 17 and 18) by turning the handwheel 5, until the pin 153 comes exactly between the fingers 150, 151 which have previously been adjusted by means of the cone 152 to caliper closely over this pin. The handwheel 5 is not turned after this adjustment has been made.

The handle of valve 34' is then pushed away from the operator to admit air to the forward end of cylinder 34 and thereby retract the bar 32 and with it the centering head 33, after which the block 154 is removed from the template body.

Next, handle members 54 and 69b are pulled forward thus actuating valves 52 and 69, in "rapid approach" to advance the tool carriage 21 about five inches, and the front stop nut 25 is run up against the front end of the carriage.

Handle member 54 is then locked in "fine feed" position by operation of the clamping screw 88.

Then, with the tool carriage in its advanced position, as thus determined by the stop nut 25, the tool bars 28 (fitted with tools) are pulled forward until the cutting tips of the tools register exactly with the limits of forward feed of the finished cuts on the outer faces of the template body flanges, whereafter the clamping bolts 30 are tightened to hold the tool bars in this adjusted condition.

The clamping screw 88 is then loosened and the handle member 54 pushed back to actuate the valve 52 so that cylinder 24 will retract the tool carriage to the limit of its rearward motion as determined by the stop nut 25' which has already been adjusted.

Thereafter, the handle member 51 is pushed back and the valve controlling cylinder 6 is thereby actuated to move the tail stock 3 to release the template body, the latter being removed and placed aside.

The apparatus is now adjusted for operation in regular production upon valve bodies of the type and size of the gauging template body.

In adjusting the apparatus for operation upon gate-valve bodies, whether of the type having a single wedge-guide rib, or two such ribs, the only major change in the steps hereinbefore set forth concerns adjustment of the height of the slide 131 of the gauging head 33. In this case the height will be such that the gauging fingers 150, 151 can extend into the side opening of the valve body for engagement with such rib or ribs, as shown in Figs. 2 and 14.

For a description of the operation, in regular production, of the apparatus as thus far described, it will be assumed that it has been adjusted for machining an angle-valve body (the type shown in Figs. 15, 16, 10 and 11) and it is thought that the operation in connection with other types of valve bodies, including gate-valve bodies, will be readily understood when the characteristics of such other types and the modifications of the apparatus to adapt it for use with them, as hereinbefore brought out, are kept in mind.

Again referring particularly to Figs. 1 to 11, 15, 16, 23 to 27 and 33 to 38, the operation of the apparatus in regular production entails, essentially, the following steps, performed in the sequence given, namely:

The driver 156 is dropped into the side opening of the valve body and the driver bar 157 is inserted, passing it through the rectangular opening 159 in the driver (Figs. 15, 16).

Then the body is loaded into the machine on the centers 17 and 18, with the ends 160, 161 of the driver bar inserted in the openings 162, 163 of the centers and the side opening of the body facing vertically upward, the tail stock 3 being closed in toward the head stock 2 by pulling the handle member 51 which actuates the valve 49 to maintain pressure in the right-hand end of the cylinder 6 served by the pipe 43.

The spindles 7 and 8 are then jogged forward slightly, approximately 5° to 10°, and the gauge block 154 put in place in the side opening of the body (Figs. 10, 11), after which the handle of the air valve 34' is pulled to bring the gauging head 33 out to gauging position and the valve body is spotted, endwise, by registering the pin 153 of the gauging block 154 with the gauging fingers 150, 151 by turning the hand wheel 5, as previously described, the pressure maintained in cylinder 6 causing tail stock 3 to follow the movement of head stock 2 with the valve body interposed between the centers 17 and 18 acting as a link.

After the valve body is thus spotted, the handle of the air valve 34' is pushed back to admit air to the cylinder 34 to retract the gauging head 33, and the gauge block 154 is removed from the valve body.

Rotation of the spindles 7 and 8, and with them of the valve body held by the centers 17 and 18 and driven by the driver 156 and driver bar 157, is now started by pushing the "forward" button 183 of the main motor switch 72, and feeding forward of the tool carriage 21 with the cutting tools is started by pulling on the handle member 54 which actuates the valve 52 controlling admission of pressure to the cylinder 24, so that the carriage moves forward to the work in "fine feed." At the same time the setting of needle valve 55 will be checked upon the dial plate 59, Fig. 4, and, if by taking a reading of the feed indicating gauge 89, Figs. 33 to 38, it is found that the feeding movement is too fast or too slow, appropriate adjustment of the needle valve 55 may be made.

It will be noted, moreover, that where the tool relieving means of Figs. 28 to 32 are used, adjustment of the control valve 52 for fine feed will admit pressure to the cylinder 83 of these means to depress the pistons 84 thereof and lock the tools in cutting position by the action of the complemental conical members 80 and 81.

With tool feeding conditions considered to be satisfactory, the handle member 60b is pulled to actuate the control valve 60 for "rapid approach" of the tool carriage to bring the tools up to the work, whereafter the handle member 60b is released, the valve 60 closes under the influence of the return spring 60c, and forward movement of the tool carriage continues in "fine feed."

Upon completion of the cut, which is determined by the front end of the tool carriage abutting against the previously adjusted stop nut 25, the handle member 54 is pushed in to neutral position, thus closing the control valve 52.

Rotation of the spindles 7 and 8 is then stopped, preferably with the side opening of the valve body facing upward, and the tool carriage is retracted by pushing handle member 54 which, while it actuates control valve 52 to retract the tool carriage, at the same time relieves the pressure in the cylinders 83 of the tool relieving means and permits the spring-pressed plungers 78 to move the tips of the tools away from the machined surfaces of the valve body.

Thereafter, the tail stock may be retracted by pushing the handle member 51 controlling the cylinder 6, and the valve body is taken out of the machine and the driver and driver bar removed from it.

Other valve bodies are thereafter similarly machined in sequence, and it will be noted that, due to the fact that the bodies are held upon the spindle centers 17 and 18 by engagement with the peripheries of accurately formed cored openings at the body flanges, and that the gauging of each valve body as it is loaded into the machine, and the cuts produced by the tools, are the same for it as for all other bodies of the same type and size, due to the adjustment of the machine as hereinbefore explained, a uniform product will be the result, and the scrapping of valve bodies incorrectly machined because of improper gauging and the like will be eliminated.

This completes the first operation for valve bodies of a given type and size. Obviously, when bodies of a different size or type are to be machined the apparatus will have to be adjusted in accordance with the preceding description by the employment of appropriate, already-machined, template bodies.

Regardless of the type of valve body, it will be apparent that, where it has two openings on one axis, and a third, or side, opening on an axis at right angles to the axis of the said two openings, such right-angular arrangement of the axes being assured by the fact that the openings are accurately core-formed, this first machining operation makes possible accurate machining, simultaneously, of the faces of the flanges of the said two openings at right angles to their common axis and equidistant, or a predetermined desired distance or distances, from the axis of the third, or side, opening, as is desired. This result is due to the fact that the template valve bodies are precision machined and the apparatus is adjusted by reference to any one of them in such a manner that it can reproduce the desired cuts identically so long as the cutting tips of the tools remain intact uniformly.

It will be noted that for various types of valve bodies the flanges, particularly those of the aligned openings, are machined to produce stepped faces, as shown in Figs. 39, 41 and 47, the diameter of the offset portions of which is determined and accurately controlled by the adjustable stop nut 25. This stepped face serves a useful purpose in positioning and supporting the valve bodies for subsequent machining operations, as hereinafter indicated and as shown particularly in Figs. 39 to 43.

In some types of valves, however, it is desirable to machine the flanges with flat, or unstepped, faces, and a preferred manner in which this may be done is illustrated in Fig. 48. In valve bodies which are to have their flanges thus machined the cored openings are provided where they merge into the flanges with relief surfaces or bevels B, preferably formed by the cores and having a flare greater than the angle of taper of the centers 17 and 18. For example, as shown in Fig. 48, the taper of the center is at an angle of 30°, while the flare of the bevel B is at an angle of 45°. This makes it possible to advance the cutting tools T to an extent sufficient to completely face the flanges and still not come into contact with the surfaces of the centers 17 and 18. Obviously, the extent of advance of the cutting tools can be accurately determined and limited by the adjustment and setting of the stop nut 25.

For performing the second machining operation on globe-valve, angle-valve and check-valve bodies, after the flanges of the axially aligned openings have been machined to provide them with the conventional stepped face contour (Fig. 39) by the first operation, one embodiment of suitable apparatus is shown in Figs. 39 and 40.

As hereinbefore pointed out, in this second operation the face of the flange of the third, or side, opening is machined perpendicular to its axis and to the machined faces of the flanges already machined by the first operation, and is preferably performed in a boring machine for use with which the jigging and gauging tools of Figs. 39 and 40 are specially adapted.

The jig 192 is properly fixed centrally of the bed 193 of the boring machine, and preferably includes simultaneously and synchronously adjustable jaws 194 carrying free plates 195 properly contoured for intimate clamping engagement with the machined stepped faces of the two flanges already machined. Thus, supported by these face plates 195, the valve body may be rotatably adjusted about the axis of its aligned openings prior to tight clamping adjustment of the jaws 194. Also carried by the jig 192 are adjustable stop members 196 for engagement with the under surface of the flange of the third, or side, opening of the body.

The indexing head 197 of the boring machine which is, of course, properly centered, is provided with a plurality of wedge-shaped gauges 198 of various sizes to accommodate a variety of sizes of valve bodies, and after the valve body to be subjected to the second operation is supported in the clamping jaws 194, and is thus centered beneath the appropriate gauge 198, the indexing head 197 is lowered and as the gauge 198 enters the body opening of the flange to be machined the valve body will be rotatably adjusted about the axis of its aligned openings to bring the axis of the said third, or side, opening to vertical position. Thereafter, while the gauge 198 is still rigidly engaged with the periphery of this opening the clamping jaws 194 may be tightened and the stop members 196 adjusted rigidly against the under face of the flange at diametrically opposite points.

By virtue of this jigging and clamping operation it will be seen that the already machined flange faces which are equidistant from the axis of the side opening are employed in cooperation with the jaws 194 of the jig to center the axis of this latter opening in the boring machine and to insure that this axis is vertical as viewed in Fig. 39, and the use of the gauge 198 insures vertical adjustment of this axis as viewed in Fig. 40. Hence, when the indexing head 197 with gauge 198 is withdrawn upwardly, and the boring machine set in operation, the tool 199 will finish the face of the flange of the side opening to provide a surface perpendicular to the finished faces of the flanges of the aligned openings of the body and also perpendicular to the axis of its own opening.

The third operation, that of drilling the bolt holes in the flanges, may be performed in a multiple-spindle drill press in the customary manner, but making use of the machined faces of the several flanges as means for accurately positioning the valve body in the drill press to insure drilling of the bolt holes perpendicular to the faces of the flanges and hence parallel to the axes of their respective openings.

In performing the second machining operation on a gate-valve body, the machining of the flange of the third, or side, opening, it is preferable, due to the elongated shape of this flange, to carry out this operation upon a milling machine. To this end, as shown in Figs. 41, 42 and 43, the bed 200 of the milling machine is supplied with a rigidly attached jig 201 the upper surface of which is formed in planes parallel with the machine bed and of a conformation to provide a socket 202 to receive and rotatably position a stepped, machined flange of one of the aligned openings of the gate-valve body. A tongue 203 extending outwardly from this jig carries a slide 204 having posts 205 on which is mounted a wedge-shaped gauge 206 properly centered with respect to the center of the jig 201.

Hence, when a gate-valve body is positioned on the jig 201, with one of its finished stepped flanges seated in the socket 202, as shown particularly in Fig. 41, the body may be rotated about the axis of the opening at such flange with this axis maintained in assured vertical position. By sliding the gauge 206 into the side opening of the body the axis of this opening will be positioned at right angles to the path of travel of the facing milling cutter 207. Lugs 208 bolted to the bed 200 may then be forced into clamping engagement with the flange resting upon the jig 201, to secure the valve body to the bed 200, and jack screws 209, also secured to the bed 200 (but only partially shown in Fig. 43) may be engaged behind the flange of the side opening to forestall any tendency for the valve body to rotate under the impact of the cutter 207.

When the valve body is firmly and immovably secured to the bed 200, the slide 204 with its gauge 206 is removed and the finishing cut (or cuts) made on the flange by the milling cutter 207.

As in the case of the mounting of the valve body shown in Figs. 39 and 40, the employment of one of the already accurately machined flanges as a support for the body, and the gauging of the side opening as described, insures accurate machining of the face of the flange at the side opening perpendicular to the faces of the flanges of the aligned openings and perpendicular to the axis of its own, side, opening.

For one step of the third operation, drilling of the bolt holes in the elongated flange of the side opening of gate-valve bodies, a jig, substantially as shown in Figs. 44 to 47, may be employed for greater facility and accuracy.

This jig, in the form illustrated, preferably includes a U-shaped frame 210 having a rigidly attached top plate 211 and an adjustable clamping bar 212 bearing at its ends 213 against the legs of the frame 210. The jig may be of a size to accommodate at least two valve bodies for drilling, and the top plate is provided with stops 214 the lower faces of which lie in a plane perpendicular to the axes of the drills of a multiple-spindle drilling machine for which guides 215 are provided in the top plate 211.

The valve bodies will have the flanges of their side openings properly located beneath the drill guides 215 by spacing and clamping members 216 bearing against the finished flanges of the aligned body openings and secured by bolting bars 217. The finished flanges of the side openings of the bodies are drawn tight against the faces of the stops 214 by clamping members 218 secured by clamping bolts 219.

It will be apparent that by utilizing the finished surfaces of the valve body flanges, particularly the flanges of the side openings, as gauging surfaces for contact with the cooperating parts of the jig 210, the flanges of these side openings will be properly arranged, located and supported for the drilling operation to insure the predetermined desired arrangement and axial relation of the drilled bolt holes.

Obviously, within certain limits, the jig 210 may be adapted to support valve bodies of various sizes by the provision of appropriately formed and fitted top plates 211 and clamping bars and members 212 and 216, respectively.

In accordance with the purpose of the invention which, as has hereinbefore been stated, is the provision of apparatus for so machining valve bodies that the machined surfaces will bear a predetermined desired relation to each other and to core-formed surfaces of the interiors thereof rather than to their sand-molded surfaces, it will be seen that, after operation of the apparatus for gauging and machining the bodies in accordance with the first machining operation, at least one accurately finished surface, and preferably two such surfaces having reference to the flanges of the axially aligned openings, will

What I claim is:

1. In machining apparatus of lathe type a head stock and a tail stock, rotary work piece holding and driving spindle means carried by said stocks, said stocks being relatively movable along the axis of rotation of said spindle means, a tool carriage and means for moving it toward and away from said axis of rotation, fluid-pressure means for axially moving said tail stock to rotatively secure a work piece between the spindle means of said two stocks, gauging means carried by said tool carriage and movable toward and away from said axis of rotation, and means for axially moving said head stock and with it said tail stock and the work piece secured between said spindle means to thereby locate said work piece with respect to said gauging means, the fluid-pressure means for moving said tail stock accommodating the axial movement of said tail stock to axial movement of said head stock.

2. In machining apparatus of lathe type, a head stock and a tail stock, rotative spindle means associated with one of said stocks, means for driving said spindle means including an electric motor, said head and tail stocks being relatively movable along the axis of rotation of said spindle means, a tool carriage and means for moving it toward and away from said axis of rotation, fluid-operated means for axially moving said tail stock to rotatively secure a work piece with respect to said spindle means, manually operable means including a fluid-control valve for actuating said fluid-operated means, and means for preventing actuation of the motion imparting means of said tail stock to move the same away from said head stock when the spindle driving means are energized including a latch member in operative association with said manually operable means and an actuating solenoid for said latch member in circuit with said motor.

3. In machining apparatus, means for holding and driving a work piece, a tool carriage and means for moving it toward and away from said holding and driving means, the means for moving said tool carriage including a fluid-pressure actuated cylinder and piston means, a control valve for admitting pressure fluid to said cylinder to move said carriage toward said holding and driving means, means interposed between said valve and cylinder to vary the flow of pressure fluid and thereby vary the speed of movement of said carriage within limits of "fine feed," and valve means operable when said carriage is moving in thus-controlled "fine feed" for by-passing the pressure fluid around said interposed means to cause "rapid approach" of the carriage toward said holding and driving means.

4. In machining apparatus of lathe type, a bed, a head stock and a tail stock relatively slidable upon said bed on a common axis, rotatable workpiece holding spindle means carried by each of said stocks, means for driving the spindle means of one of said stocks, a tool carriage movable on said bed upon a fixed axis normal to the axis of rotation of said spindle means, gauging means carried by said tool carriage and movable therewith and with respect thereto upon said normal axis, tool means mounted upon said carriage and adjustable laterally thereof and with respect to said gauging means, means for rotating said spindle means, means for moving said tool carriage and the tool means thereon toward and away from said axis of rotation, means for positioning said gauging means in predetermined position relatively to said axis of rotation, and means for moving said head and tail stocks and therewith the work-piece along said axis of rotation concurrently, to thereby adjust the work-piece in predetermined relation to said gauging means and hence to said tool means.

5. In machining apparatus of lathe type, means for holding and driving a work-piece, an electric motor serving to drive said means, a tool carriage and fluid-actuated means for moving it toward and away from said holding and driving means, control means for energizing and de-energizing said electric motor, control means for said fluid-actuated carriage moving means including a fluid control valve and manually operated means for actuating same, said control valve being provided with a fluid-actuated motor member under the control of a solenoid-actuated valve, and means including said solenoid-actuated valve interconnected with said two control means for preventing actuation of the motion imparting means of said tool carriage to move the same toward said holding and driving means when said electric motor is de-energized.

GEORGE G. ALLENBAUGH.

REFERENCES CITED

The following references are of record in the file of this patent:

UNITED STATES PATENTS

| Number | Name | Date |
|---|---|---|
| 272,304 | Muller | Feb. 13, 1883 |
| 283,376 | Coffin | Aug. 21, 1883 |
| 450,399 | Corliss | Apr. 14, 1891 |
| 493,807 | Beale | Mar. 21, 1893 |
| 654,757 | Obermier | July 31, 1900 |
| 1,029,642 | Slick | June 18, 1912 |
| 1,564,483 | Kenyon | Dec. 8, 1925 |
| 1,914,984 | Smith | June 20, 1933 |
| 1,950,039 | Smith | Mar. 6, 1934 |
| 2,330,354 | Hepburn | Sept. 28, 1943 |
| 2,330,566 | Edmonds et al. | Sept. 28, 1943 |
| 2,372,004 | Kingsinger | Mar. 20, 1945 |
| 2,387,012 | Daugherty | Oct. 16, 1945 |
| 2,389,746 | Sparks | Nov. 27, 1945 |
| 2,396,399 | Veale | Mar. 12, 1946 |
| 2,415,492 | Hines | Feb. 11, 1947 |
| 2,420,296 | Bishop | May 13, 1947 |